US012771836B2

(12) United States Patent
Chuang et al.

(10) Patent No.: US 12,771,836 B2

(45) Date of Patent: Oct. 20, 2026

(54) METHODS AND APPARATUS FOR IMPROVEMENT OF TRANSFORM INFORMATION CODING ACCORDING TO INTRA CHROMA CROSS-COMPONENT PREDICTION MODEL IN VIDEO CODING

(71) Applicant: MEDIATEK INC., Hsinchu City (TW)

(72) Inventors: Cheng-Yen Chuang, Hsinchu City (TW); Hsin-Yi Tseng, Hsinchu City (TW); Chia-Ming Tsai, Hsinchu City (TW); Chen-Yen Lai, Hsinchu City (TW); Yu-Ling Hsiao, Hsinchu City (TW); Chih-Wei Hsu, Hsinchu City (TW); Yi-Wen Chen, San Jose, CA (US); Ching-Yeh Chen, Hsinchu City (TW); Tzu-Der Chuang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 19/141,203

(22) PCT Filed: Jan. 5, 2024

(86) PCT No.: PCT/CN2024/070738

§ 371 (c)(1),
(2) Date: Jun. 19, 2025

(87) PCT Pub. No.: WO2024/149159

PCT Pub. Date: Jul. 18, 2024

(65) Prior Publication Data

US 2026/0214217 A1 Jul. 23, 2026

Related U.S. Application Data

(60) Provisional application No. 63/479,190, filed on Jan. 10, 2023, provisional application No. 63/479,191, filed on Jan. 10, 2023.

(51) Int. Cl.
*H04N 19/117* (2014.01)
*H04N 19/159* (2014.01)
(Continued)

(52) U.S. Cl.
CPC ......... *H04N 19/117* (2014.11); *H04N 19/159* (2014.11); *H04N 19/186* (2014.11); *H04N 19/196* (2014.11); *H04N 19/86* (2014.11)

(58) Field of Classification Search
CPC .......................... H04N 19/117; H04N 19/159
(Continued)

(56) References Cited

U.S. PATENT DOCUMENTS 11,172,216 B1 11/2021 Zhang
2020/0296382 A1 9/2020 Zhao
(Continued)

OTHER PUBLICATIONS

International Search Report and Written Opinion dated Mar. 29, 2024, issued in application No. PCT/CN2024/070738.
(Continued)

*Primary Examiner* — Amir Shahnami
(74) *Attorney, Agent, or Firm* — McClure, Qualey & Rodack, LLP

(57) ABSTRACT

A method and apparatus for video coding using coding tools including one or more cross component models related modes. According to this method, a prediction candidate list comprising one or more inherited CCP (Cross-Component Prediction) candidates is determined, wherein CCM (Cross-Component Model) information associated with at least one CCP candidate is stored in addition to one or more inherited model parameters of said at least one CCP candidate. The second-colour block is encoded or decoded by using information comprising the prediction candidate list, wherein when said at least one CCP candidate is selected for the current block, prediction data for the second-colour block
(Continued)

are generated by applying said one or more inherited model parameters of said at least one CCP candidate along with the CCM information to reconstructed first-colour block.

14 Claims, 18 Drawing Sheets

(51) Int. Cl.
*H04N 19/186* (2014.01)
*H04N 19/196* (2014.01)
*H04N 19/86* (2014.01)

(58) Field of Classification Search
USPC .................................................... 375/240.12
See application file for complete search history.

(56) References Cited

U.S. PATENT DOCUMENTS

2022/0239932 A1* 7/2022 Zhang .................. H04N 19/117
2022/0248025 A1* 8/2022 Deng ................... H04N 19/132

OTHER PUBLICATIONS

Chen, J., et al.; "Algorithm Description of Joint Exploration Test Model 7 (JEM 7);" Joint Video Exploration Team (JVET) of ITU-T SG 16 WP 3 and ISO/IEC JTC 1/SC 29/WG 11; Jul. 2017; pp. 1-50.
Han, Y., et al.; "CE4.4.6: Improvement on Merge/Skip mode;" Joint Video Exploration Team (JVET) of ITU-T SG 16 WP 3 and ISO/IEC JTC 1/SC 29/WG 11; Oct. 2018; pp. 1-6.

* cited by examiner

METHODS AND APPARATUS FOR IMPROVEMENT OF TRANSFORM INFORMATION CODING ACCORDING TO INTRA CHROMA CROSS-COMPONENT PREDICTION MODEL IN VIDEO CODING

CROSS REFERENCE TO RELATED APPLICATIONS

The present invention is a non-Provisional Application of and claims priority to U.S. Provisional Patent Application No. 63/479,190, filed on Jan. 10, 2023 and U.S. Provisional Patent Application No. 63/479,191, filed on Jan. 10, 2023. The U.S. Provisional Patent Applications are hereby incorporated by reference in their entireties.

FIELD OF THE INVENTION

The present invention relates to video coding system using cross-component prediction modes. In particular, the present invention relates to the candidate list comprising one or more inherited cross-component candidates for coding colour video sequences.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video encoding system incorporating loop processing. For Intra Prediction 110, the prediction data is derived based on previously coded video data in the current picture. For Inter Prediction 112, Motion Estimation (ME) is performed at the encoder side and Motion Compensation (MC) is performed based on the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. Some new tools relevant to the present invention are reviewed as follows.

Partitioning of the CTUs Using a Tree Structure

In HEVC, a CTU is split into CUs by using a quaternary-tree (QT) structure denoted as coding tree to adapt to various local characteristics. The decision whether to code a picture area using inter-picture (temporal) or intra-picture (spatial) prediction is made at the leaf CU level. Each leaf CU can be further split into one, two or four Pus according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU.

In VVC, a quadtree with nested multi-type tree using binary and ternary splits segmentation structure replaces the concepts of multiple partition unit types, i.e. it removes the separation of the CU, PU and TU concepts except as needed for CUs that have a size too large for the maximum transform length, and supports more flexibility for CU partition shapes. In the coding tree structure, a CU can have either a square or rectangular shape. A coding tree unit (CTU) is first partitioned by a quaternary tree (a.k.a. quadtree) structure. Then the quaternary tree leaf nodes can be further partitioned by a multi-type tree structure. As shown in FIG. 2, there are four splitting types in multi-type tree structure, vertical binary splitting (SPLIT_BT_VER 210), horizontal binary splitting (SPLIT_BT_HOR 220), vertical ternary splitting (SPLIT_TT_VER 230), and horizontal ternary splitting (SPLIT_TT_HOR 240). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU.

FIG. 3 illustrates the signalling mechanism of the partition splitting information in quadtree with nested multi-type tree coding tree structure. A coding tree unit (CTU) is treated as the root of a quaternary tree and is first partitioned by a quaternary tree structure. Each quaternary tree leaf node (when sufficiently large to allow it) is then further partitioned by a multi-type tree structure. In quadtree with nested multi-type tree coding tree structure, for each CU node, a first flag (split_cu_flag) is signalled to indicate whether the node is further partitioned. If the current CU node is a quadtree CU node, a second flag (split_qt_flag) whether it's a QT partitioning or MTT partitioning mode. When a node is partitioned with MTT partitioning mode, a third flag (mtt_split_cu_vertical_flag) is signalled to indicate the splitting direction, and then a fourth flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU is derived as shown in Table 1.

TABLE 1

MttSplitMode derivations based on multi-type tree syntax elements

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

FIG. 4 shows a CTU divided into multiple CUs with a quadtree and nested multi-type tree coding block structure, where the bold block edges represent quadtree partitioning and the remaining edges represent multi-type tree partitioning. The quadtree with nested multi-type tree partition provides a content-adaptive coding tree structure comprised of CUs. The size of the CU may be as large as the CTU or as small as 4×4 in units of luma samples. For the case of the 4:2:0 chroma format, the maximum chroma CB size is 64×64 and the minimum size chroma CB consist of 16 chroma samples.

In VVC, the maximum supported luma transform size is 64×64 and the maximum supported chroma transform size is 32×32. When the width or height of the CB is larger the maximum transform width or height, the CB is automatically split in the horizontal and/or vertical direction to meet the transform size restriction in that direction.

The following parameters are defined for the quadtree with nested multi-type tree coding tree scheme. These parameters are specified by SPS (Sequence Parameter Set) syntax elements and can be further refined by picture header syntax elements.

- CTU size: the root node size of a quaternary tree
- MinQTSize: the minimum allowed quaternary tree leaf node size
- MaxBtSize: the maximum allowed binary tree root node size
- MaxTtSize: the maximum allowed ternary tree root node size
- MaxMttDepth: the maximum allowed hierarchy depth of multi-type tree splitting from a quadtree leaf
- MinCbSize: the minimum allowed coding block node size In one example of the quadtree with nested multi-type tree coding tree structure, the CTU size is set as 128×128 luma samples with two corresponding 64×64 blocks of 4:2:0 chroma samples, the MinQTSize is set as 16×16, the MaxBtSize is set as 128×128 and MaxTtSize is set as 64×64, the MinCbsize (for both width and height) is set as 4×4, and the MaxMttDepth is set as 4. The quaternary tree partitioning is applied to the CTU first to generate quaternary tree leaf nodes. The quaternary tree leaf nodes may have a size from 16×16 (i.e., the MinQTSize) to 128×128 (i.e., the CTU size). If the leaf QT node is 128×128, it will not be further split by the binary tree since the size exceeds the MaxBtSize and MaxTtSize (i.e., 64×64). Otherwise, the leaf qdtree node can be further partitioned by the multi-type tree. Therefore, the quaternary tree leaf node is also the root node for the multi-type tree and it has multi-type tree depth (mttDepth) as 0. When the multi-type tree depth reaches MaxMttDepth (i.e., 4), no further splitting is considered. When the multi-type tree node has width equal to MinCbsize, no further horizontal splitting is considered. Similarly, when the multi-type tree node has height equal to MinCbsize, no further vertical splitting is considered.

In VVC, the coding tree scheme supports the ability for the luma and chroma to have a separate block tree structure. For P and B slices, the luma and chroma CTBs in one CTU have to share the same coding tree structure. However, for I slices, the luma and chroma can have separate block tree structures. When the separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice always consists of coding blocks of all three colour components unless the video is monochrome.

Virtual Pipeline Data Units (VPDUs)

Virtual pipeline data units (VPDUs) are defined as non-overlapping units in a picture. In hardware decoders, successive VPDUs are processed by multiple pipeline stages at the same time. The VPDU size is roughly proportional to the buffer size in most pipeline stages, so it is important to keep the VPDU size small. In most hardware decoders, the VPDU size can be set to maximum transform block (TB) size.

However, in VVC, ternary tree (TT) and binary tree (BT) partition may lead to the increasing of VPDUs size.

In order to keep the VPDU size as 64×64 luma samples, the following normative partition restrictions (with syntax signalling modification) are applied in VTM, as shown in FIG. 5:

- TT split is not allowed (as indicated by "X" in FIG. 5) for a CU with either width or height, or both width and height equal to 128.
- For a 128×N CU with N≤64 (i.e. width equal to 128 and height smaller than 128), horizontal BT is not allowed.

For an N×128 CU with N≤64 (i.e. height equal to 128 and width smaller than 128), vertical BT is not allowed. In FIG. 5, the luma block size is 128×128. The dashed lines indicate block size 64×64. According to the constraints mentioned above, examples of the partitions not allowed are indicated by "X" as shown in various examples (510-580) in FIG. 5.

Intra Chroma Partitioning and Prediction Restriction

In typical hardware video encoders and decoders, processing throughput drops when a picture has smaller intra blocks because of sample processing data dependency between neighbouring intra blocks. The predictor generation of an intra block requires top and left boundary reconstructed samples from neighbouring blocks. Therefore, intra prediction has to be sequentially processed block by block.

In HEVC, the smallest intra CU is 8×8 luma samples. The luma component of the smallest intra CU can be further split into four 4×4 luma intra prediction units (PUs), but the chroma components of the smallest intra CU cannot be further split. Therefore, the worst case hardware processing throughput occurs when 4×4 chroma intra blocks or 4×4 luma intra blocks are processed. In VVC, in order to improve worst case throughput, chroma intra CBs smaller than 16 chroma samples (size 2×2, 4×2, and 2×4) and chroma intra CBs with width smaller than 4 chroma samples (size 2×N) are disallowed by constraining the partitioning of chroma intra CBs.

In single coding tree, a smallest chroma intra prediction unit (SCIPU) is defined as a coding tree node whose chroma block size is larger than or equal to 16 chroma samples and has at least one child luma block smaller than 64 luma samples, or a coding tree node whose chroma block size is not 2×N and has at least one child luma block 4×N luma samples. It is required that in each SCIPU, all CBs are inter, or all CBs are non-inter, i.e., either intra or intra block copy (IBC). In case of a non-inter SCIPU, it is further required that chroma of the non-inter SCIPU shall not be further split and luma of the SCIPU is allowed to be further split. In this way, the small chroma intra CBs with size less than 16 chroma samples or with size 2×N are removed. In addition, chroma scaling is not applied in case of a non-inter SCIPU. Here, no additional syntax is signalled, and whether a SCIPU is non-inter can be derived by the prediction mode of the first luma CB in the SCIPU. The type of a SCIPU is inferred to be non-inter if the current slice is an I-slice or the current SCIPU has a 4×4 luma partition in it after further split one time (because no inter 4×4 is allowed in VVC); otherwise, the type of the SCIPU (inter or non-inter) is indicated by one flag before parsing the CUS in the SCIPU.

For the dual tree in intra picture, the 2×N intra chroma blocks are removed by disabling vertical binary and vertical ternary splits for 4×N and 8×N chroma partitions, respectively. The small chroma blocks with sizes 2×2, 4×2, and 2×4 are also removed by partitioning restrictions.

In addition, a restriction on picture size is considered to avoid 2×2/2×4/4×2/2×N intra chroma blocks at the corner of pictures by considering the picture width and height to be multiple of max (8, MinCbSizeY).

Intra Mode Coding with 67 Intra Prediction Modes

To capture the arbitrary edge directions presented in natural video, the number of directional intra modes in VVC is extended from 33, as used in HEVC, to 65. The new directional modes not in HEVC are depicted as red dotted arrows in FIG. 6, and the planar and DC modes remain the same. These denser directional intra prediction modes apply for all block sizes and for both luma and chroma intra predictions.

In VVC, several conventional angular intra prediction modes are adaptively replaced with wide-angle intra prediction modes for the non-square blocks.

In HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

To keep the complexity of the most probable mode (MPM) list generation low, an intra mode coding method with 6 MPMs is used by considering two available neighbouring intra modes. The following three aspects are considered to construct the MPM list:

- Default intra modes
- Neighbouring intra modes
- Derived intra modes.

A unified 6-MPM list is used for intra blocks irrespective of whether MRL and ISP coding tools are applied or not. The MPM list is constructed based on intra modes of the left and above neighbouring block. Suppose the mode of the left is denoted as Left and the mode of the above block is denoted as Above, the unified MPM list is constructed as follows:

- When a neighbouring block is not available, its intra mode is set to Planar by default.
- If both modes Left and Above are non-angular modes:
  - MPM list→{Planar, DC, V, H, V−4, V+4}
- If one of modes Left and Above is angular mode, and the other is non-angular:
  - Set a mode Max as the larger mode in Left and Above
  - MPM list→{Planar, Max, Max−1, Max+1, Max−2, Max+2}
- If Left and Above are both angular and they are different:
  - Set a mode Max as the larger mode in Left and Above
  - If Max−Min is equal to 1:
  - MPM list→{Planar, Left, Above, Min−1, Max+1, Min−2}
  - Otherwise, if Max-Min is greater than or equal to 62:
  - MPM list→{Planar, Left, Above, Min+1, Max−1, Min+2}
  - Otherwise, if Max-Min is equal to 2:
  - MPM list→{Planar, Left, Above, Min+1, Min−1, Max+1}
  - Otherwise:
  - MPM list→{Planar, Left, Above, Min−1, Min+1, Max−1}
- If Left and Above are both angular and they are the same:
  - MPM list→{Planar, Left, Left−1, Left+1, Left−2, Left+2}

Besides, the first bin of the MPM index codeword is CABAC context coded. In total three contexts are used, corresponding to whether the current intra block is MRL enabled, ISP enabled, or a normal intra block.

During 6 MPM list generation process, pruning is used to remove duplicated modes so that only unique modes can be included into the MPM list. For entropy coding of the 61 non-MPM modes, a Truncated Binary Code (TBC) is used.

Wide-Angle Intra Prediction for Non-Square Blocks

Conventional angular intra prediction directions are defined from 45 degrees to −135 degrees in clockwise direction. In VVC, several conventional angular intra prediction modes are adaptively replaced with wide-angle intra prediction modes for non-square blocks. The replaced modes are signalled using the original mode indexes, which are remapped to the indexes of wide angular modes after parsing. The total number of intra prediction modes is unchanged, i.e., 67, and the intra mode coding method is unchanged.

To support these prediction directions, the top reference with length 2W+1, and the left reference with length 2H+1, are defined as shown in FIG. 7A and FIG. 7B respectively.

The number of replaced modes in wide-angular direction mode depends on the aspect ratio of a block. The replaced intra prediction modes are illustrated in Table 2.

TABLE 2

Intra prediction modes replaced by wide-angular modes

| Aspect ratio | Replaced intra prediction modes |
|---|---|
| W/H = 16 | Modes 2, 3, 4, 5, 6, 7, 8, 9, 10, 11, 12, 13, 14, 15 |
| W/H = 8 | Modes 2, 3, 4, 5, 6, 7, 8, 9, 10, 11, 12, 13 |
| W/H = 4 | Modes 2, 3, 4, 5, 6, 7, 8, 9, 10, 11 |
| W/H = 2 | Modes 2, 3, 4, 5, 6, 7, |
| W/H = 1 | None |
| W/H = 1/2 | Modes 61, 62, 63, 64, 65, 66 |
| W/H = 1/4 | Mode 57, 58, 59, 60, 61, 62, 63, 64, 65, 66 |
| W/H = 1/8 | Modes 55, 56, 57, 58, 59, 60, 61, 62, 63, 64, 65, 66 |
| W/H = 1/16 | Modes 53, 54, 55, 56, 57, 58, 59, 60, 61, 62, 63, 64, 65, 66 |

In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with the extension of intra prediction modes. Since HEVC specification does not support prediction angle below −135° and above 45°, luma intra prediction modes ranging from 2 to 5 are mapped to 2. Therefore, chroma DM derivation table for 4:2:2: chroma format is updated by replacing some values of the entries of the mapping table to convert prediction angle more precisely for chroma blocks.

Cross-Component Linear Model (CCLM) Prediction

To reduce the cross-component redundancy, a cross-component linear model (CCLM) prediction mode is used in the VVC, for which the chroma samples are predicted based on the reconstructed luma samples of the same CU by using a linear model as follows:

$$pred_C(i,j)=\alpha\cdot rec_L'(i,j)+\beta \quad (1)$$

where $pred_C(i, j)$ represents the predicted chroma samples in a CU and $rec_L'(i, j)$ represents the downsampled reconstructed luma samples of the same CU.

The CCLM parameters (α and β) are derived with at most four neighbouring chroma samples and their corresponding down-sampled luma samples. Suppose the current chroma block dimensions are W×H, then W' and H' are set as W'=W, H'=H when CCLM_LT mode is applied;

W'=W+H when CCLM_T mode is applied;

H'=H+W when CCLM_L mode is applied.

The above neighbouring positions are denoted as S[0, −1] . . . . S[W'−1, −1] and the left neighbouring positions are denoted as S[−1, 0] . . . . S[−1, H'−1]. Then the four samples are selected as S[W'/4, −1], S[3*W'/4, −1], S[−1, H'/4], S[−1, 3*H'/4] when CCLM_LT mode is applied and both above and left neighbouring samples are available;

S[W'/8, −1], S[3*W/8, −1], S[5*W'/8, −1], S[7*W'/8, −1] when CCLM_T mode is applied or only the above neighbouring samples are available;

S[−1, H'/8], S[−1, 3*H'/8], S[−1, 5*H'/8], S[−1, 7*H'/8] when CCLM_L mode is applied or only the left neighbouring samples are available.

The four neighbouring luma samples at the selected positions are down-sampled and compared four times to find two larger values: $x^D_A$ and $x^1_A$, and two smaller values: $x^d_B$ and $x^1_B$. Their corresponding chroma sample values are denoted as $y^d_A$, $y^1_A$, $y^d_B$ and $y^1_B$. Then $x_A$, $x_B$, $y_A$ and $y_B$ are derived as:

$$x_A = (x^0_A + x^1_A + 1) \gg 1; \quad (2)$$
$$x_B = (x^0_B + x^1_B + 1) \gg 1;$$
$$y_A = (y^0_A + y^1_A + 1) \gg 1;$$
$$y_B = (y^0_B + y^1_B + 1) \gg 1$$

Finally, the linear model parameters α and β are obtained according to the following equations.

$$\alpha = \frac{y_A - y_B}{x_A - x_B} \quad (3)$$

$$\beta = Y_b - \alpha \cdot X_b \quad (4)$$

FIG. 8 shows an example of the location of the left and above samples and the sample of the current block involved in the CCLM_LT mode. FIG. 8 shows the relative sample locations of N×N chroma block 810, the corresponding 2N×2N luma block 820 and their neighbouring samples (shown as filled circles).

The division operation to calculate parameter α is implemented with a look-up table. To reduce the memory required for storing the table, the diff value (difference between maximum and minimum values) and the parameter α are expressed by an exponential notation. For example, diff is approximated with a 4-bit significant part and an exponent. Consequently, the table for 1/diff is reduced into 16 elements for 16 values of the significand as follows:

DivTable[ ]={0,7,6,5,5,4,4,3,3,2,2,1,1,1,1,0} (5)

This would have a benefit of both reducing the complexity of the calculation as well as the memory size required for storing the needed tables.

Besides the above template and left template can be used to calculate the linear model coefficients together, they also can be used alternatively in the other 2 LM modes, called CCLM_T, and CCLM_L modes.

In CCLM_T mode, only the above template is used to calculate the linear model coefficients. To get more samples, the above template is extended to (W+H) samples. In CCLM_L mode, only left template are used to calculate the linear model coefficients. To get more samples, the left template is extended to (H+W) samples.

In CCLM_LT mode, left and above templates are used to calculate the linear model coefficients.

To match the chroma sample locations for 4:2:0 video sequences, two types of down-sampling filter are applied to luma samples to achieve 2 to 1 down-sampling ratio in both horizontal and vertical directions. The selection of down-sampling filter is specified by a SPS level flag. The two down-sampling filters are as follows, which are corresponding to "type-0" and "type-2" content, respectively.

$$Rec'_L(i,j) = [rec_L(2i-1,2j-1)+2\cdot rec_L(2i,2j-1)+rec_L(2i+1,2j+1)+rec_L(2i-1,2j)+2\cdot rec_L(2i,2j)+rec_L(2i+1,2j)+4]\gg 3 \quad (6)$$

$$Rec'_L(i,j) = rec_L(2i,2j-1)+rec_L(2i-1,2j)+4\cdot rec_L(2i,2j)+rec_L(2i+1,2j)+rec_L(2i,2j+1)+4]\gg 3 \quad (7)$$

Note that only one luma line (general line buffer in intra prediction) is used to make the down-sampled luma samples when the upper reference line is at the CTU boundary.

This parameter computation is performed as part of the decoding process, and is not just as an encoder search operation. As a result, no syntax is used to convey the α and β values to the decoder.

For chroma intra mode coding, a total of 8 intra modes are allowed for chroma intra mode coding. Those modes include five traditional intra modes and three cross-component linear model modes (CCLM_LT, CCLM_T, and CCLM_L). Chroma mode signalling and derivation process are shown in Table 3. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the centre position of the current chroma block is directly inherited.

TABLE 3

Derivation of chroma prediction mode from luma mode when CCLM is enabled

| Chroma prediction mode | Corresponding luma intra prediction mode 0 | 50 | 18 | 1 | X (0 <= X <= 66) |
|---|---|---|---|---|---|
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

A single binarization table is used regardless of the value of sps_cclm_enabled_flag as shown in Table 4.

TABLE 4

Unified binarization table for chroma prediction mode

| Value of intra_chroma_pred_mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

In Table 4, the first bin indicates whether it is regular (0) or CCLM modes (1). If it is LM mode, then the next bin indicates whether it is CCLM_LT (0) or not. If it is not CCLM_LT, next 1 bin indicates whether it is CCLM_L (0) or CCLM_T (1). For this case, when sps_cclm_enabled_flag is 0, the first bin of the binarization table for the corresponding intra_chroma_pred_mode can be discarded prior to the entropy coding. Or, in other words, the first bin is inferred to be 0 and hence not coded. This single binarization table is used for both sps_cclm_enabled_flag equal to 0 and 1 cases. The first two bins in Table 4 are context coded with its own context model, and the rest bins are bypass coded.

In addition, in order to reduce luma-chroma latency in dual tree, when the 64×64 luma coding tree node is partitioned with Not Split (and ISP is not used for the 64×64 CU) or QT, the chroma CUs in 32×32/32×16 chroma coding tree node are allowed to use CCLM in the following way:

If the 32×32 chroma node is not split or partitioned QT split, all chroma CUs in the 32×32 node can use CCLM If the 32×32 chroma node is partitioned with Horizontal BT, and the 32×16 child node does not split or uses Vertical BT split, all chroma CUs in the 32×16 chroma node can use CCLM.

In all the other luma and chroma coding tree split conditions, CCLM is not allowed for chroma CU.

Multiple Model CCLM (MMLM)

In the JEM (J. Chen, E. Alshina, G. J. Sullivan, J.-R. Ohm, and J. Boyce, Algorithm Description of Joint Exploration Test Model 7, document JVET-G1001, ITU-T/ISO/IEC Joint Video Exploration Team (JVET), July 2017), multiple model CCLM mode (MMLM) is proposed for using two models for predicting the chroma samples from the luma samples for the whole CU. In MMLM, neighbouring luma samples and neighbouring chroma samples of the current block are classified into two groups, each group is used as a training set to derive a linear model (i.e., a particular α and β are derived for a particular group). Furthermore, the samples of the current luma block are also classified based on the same rule for the classification of neighbouring luma samples. Three MMLM model modes (MMLM_LT, MMLM_T, and MMLM_L) are allowed for choosing the neighbouring samples from left-side and above-side, above-side only, and left-side only, respectively.

FIG. 9 shows an example of classifying the neighbouring samples into two groups. Threshold is calculated as the average value of the neighbouring reconstructed luma samples. A neighbouring sample with $Rec'_L[x,y]$ <=Threshold is classified into group 1; while a neighbouring sample with $Rec'_L[x,y]$ >Threshold is classified into group 2.

$$\begin{cases} Pred_C[x,y] = \alpha_1 \times Rec'_L[x,y] + \beta_1 & \text{if } Rec'_L[x,y] \le \text{Threshold} \\ Pred_C[x,y] = \alpha_2 \times Rec'_L[x,y] + \beta_2 & \text{if } Rec'_L[x,y] > \text{Threshold} \end{cases} \quad (8)$$

Accordingly, the MMLM uses two models according to the sample level of the neighbouring samples.

Slope Adjustment of CCLM

CCLM uses a model with 2 parameters to map luma values to chroma values as shown in FIG. 10A. The slope parameter "a" and the bias parameter "b" define the mapping as follows:

$$\text{chromaVal}=a*\text{lumaVal}+b$$

An adjustment "u" to the slope parameter is signalled to update the model to the following form, as shown in FIG. 10B:

$$\text{chromaVal}=a'*\text{lumaVal}+b'$$

where $$a' = a + u,$$

$$b' = b - u * y_r.$$

With this selection, the mapping function is tilted or rotated around the point with luminance value yr. The average of the reference luma samples used in the model creation as yr in order to provide a meaningful modification to the model. FIGS. 10A and 10B illustrates the process.

Implementation of Slope Adjustment of CCLM

Slope adjustment parameter is provided as an integer between −4 and 4, inclusive, and signalled in the bitstream. The unit of the slope adjustment parameter is (⅛)-th of a chroma sample value per luma sample value (for 10-bit content).

Adjustment is available for the CCLM models that are using reference samples both above and left of the block (e.g. "LM_CHROMA_IDX" and "MMLM_CHROMA_IDX"), but not for the "single side" modes. This selection is based on coding efficiency versus complexity trade-off considerations. "LM_CHROMA_IDX" and "MMLM_CHROMA_IDX" refers to CCLM_LT and MMLM_LT in this invention. The "single side" modes refer to CCLM_L, CCLM_T, MMLM_L, and MMLM_T in this invention.

When slope adjustment is applied for a multimode CCLM model, both models can be adjusted and thus up to two slope updates are signalled for a single chroma block.

Encoder Approach for Slope Adjustment of CCLM

The proposed encoder approach performs an SATD (Sum of Absolute Transformed Differences) based search for the best value of the slope update for Cr and a similar SATD based search for Cb. If either one results as a non-zero slope adjustment parameter, the combined slope adjustment pair (SATD based update for Cr, SATD based update for Cb) is included in the list of RD (Rate-Distortion) checks for the TU.

Convolutional Cross-Component Model (CCCM)—Single Model and Multi-Model

In CCCM, a convolutional model is applied to improve the chroma prediction performance. The convolutional model has 7-tap filter consisting of a 5-tap plus sign shape spatial component, a nonlinear term and a bias term. The input to the spatial 5-tap component of the filter consists of a centre (C) luma sample which is collocated with the chroma sample to be predicted and its above/north (N), below/south(S), left/west (W) and right/east (E) neighbours as shown in FIG. 11.

The nonlinear term (denoted as P) is represented as power of two of the centre luma sample C and scaled to the sample value range of the content:

$$P=(C*C+\text{midVal})>>\text{bitDepth}.$$

For example, for 10-bit contents, the nonlinear term is calculated as:

$$P=(C*C+512)>>10$$

The bias term (denoted as B) represents a scalar offset between the input and output (similarly to the offset term in CCLM) and is set to the middle chroma value (512 for 10-bit content).

Output of the filter is calculated as a convolution between the filter coefficients c; and the input values and clipped to the range of valid chroma samples:

$$\text{predChromaVal}=c_0C+c_1N+c_2S+c_3E+c_4W+c_5P+c_6B$$

The filter coefficients $c_i$ are calculated by minimising MSE between predicted and reconstructed chroma samples in the reference area. FIG. 12 illustrates an example of the reference area which consists of 6 lines of chroma samples above and left of the PU. Reference area extends one PU width to the right and one PU height below the PU boundaries. Area is adjusted to include only available samples. The extensions to the area (indicated as "paddings") are needed to support the "side samples" of the plus-shaped spatial filter in FIG. 11 and are padded when in unavailable areas.

The MSE minimization is performed by calculating autocorrelation matrix for the luma input and a cross-correlation vector between the luma input and chroma output. There are various known methods to solve the MSE minimization problem. For example, autocorrelation matrix can be LDL decomposed and the final filter coefficients are calculated using back-substitution. The process follows roughly the calculation of the ALF filter coefficients in ECM (Enhanced Compression Model) for the emerging video coding standard development, however LDL decomposition was chosen instead of Cholesky decomposition to avoid using square root operations. The MSE minimization problem can also be solved using Gaussian elimination.

Also, similarly to CCLM, there is an option of using a single model or multi-model variant of CCCM. The multi-model variant uses two models, one model derived for samples above the average luma reference value and another model for the rest of the samples (following the spirit of the CCLM design). Multi-model CCCM mode can be selected for PUs which have at least 128 reference samples available.

Gradient Linear Model (GLM)

Compared with the CCLM, instead of down-sampled luma values, the GLM utilizes luma sample gradients to derive the linear model. Specifically, when the GLM is applied, the input to the CCLM process, i.e., the down-sampled luma samples L, are replaced by luma sample gradients G. The other parts of the CCLM (e.g., parameter derivation, prediction sample linear transform) are kept unchanged.

$$C=\alpha\cdot G+\beta$$

For signalling, when the CCLM mode is enabled for the current CU, two flags are signalled separately for Cb and Cr components to indicate whether GLM is enabled for each component. If the GLM is enabled for one component, one syntax element is further signalled to select one of 16 gradient filters (1310-1340 in FIG. 13) for the gradient calculation. The GLM can be combined with the existing CCLM by signalling one extra flag in bitstream. When such combination is applied, the filter coefficients that are used to derive the input luma samples of the linear model are calculated as the combination of the selected gradient filter of the GLM and the down-sampling filter of the CCLM. In later ECM development, only the four gradient filers in the leftmost column (i.e., filters 1310, 1318, 1326 and 1324) are used.

Spatial Candidate Derivation

The derivation of spatial merge candidates in VVC is the same as that in HEVC except that the positions of first two merge candidates are swapped. A maximum of four merge candidates ($B_0$, $A_0$, $B_1$ and $A_1$) for current CU 1410 are selected among candidates located in the positions depicted in FIG. 14. The order of derivation is $B_0$, $A_0$, $B_1$, $A_1$ and $B_2$. Position $B_2$ is considered only when one or more neighbouring CU of positions $B_0$, $A_0$, $B_1$, $A_1$ are not available (e.g. belonging to another slice or tile) or is intra coded. After candidate at position $A_1$ is added, the addition of the remaining candidates is subject to a redundancy check which ensures that candidates with the same motion information are excluded from the list so that coding efficiency is improved. To reduce computational complexity, not all possible candidate pairs are considered in the mentioned redundancy check. Instead, only the pairs linked with an arrow in FIG. 15 are considered and a candidate is only added to the list if the corresponding candidate used for redundancy check does not have the same motion information.

Temporal Candidates Derivation

In this step, only one candidate is added to the list. Particularly, in the derivation of this temporal merge candidate for a current CU 1610, a scaled motion vector is derived based on the co-located CU 1620 belonging to the collocated reference picture as shown in FIG. 16. The reference picture list and the reference index to be used for the derivation of the co-located CU is explicitly signalled in the slice header. The scaled motion vector 1630 for the temporal merge candidate is obtained as illustrated by the dotted line in FIG. 16, which is scaled from the motion vector 1640 of the co-located CU using the POC (Picture Order Count) distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

The position for the temporal candidate is selected between candidates $C_0$ and $C_1$, as depicted in FIG. 17. If CU at position $C_0$ is not available, is intra coded, or is outside of the current row of CTUs, position $C_1$ is used. Otherwise, position $C_0$ is used in the derivation of the temporal merge candidate.

Non-Adjacent Spatial Candidate

During the development of the VVC standard, a coding tool referred as Non-Adjacent Motion Vector Prediction (NAMVP) has been proposed in JVET-L0399 (Yu Han, et al., "CE4.4.6: Improvement on Merge/Skip mode", Joint Video Exploration Team (JVET) of ITU-T SG 16 WP 3 and ISO/IEC JTC 1/SC 29/WG 11, 12th Meeting: Macao, CN, 3-12 Oct. 2018, Document: JVET-L0399). According to the NAMVP technique, the non-adjacent spatial merge candidates are inserted after the TMVP (i.e., the temporal MVP) in the regular merge candidate list. The pattern of spatial merge candidates is shown in FIG. 18. The distances between non-adjacent spatial candidates and current coding block are based on the width and height of current coding block. In FIG. 18, each small square corresponds to a NAMVP candidate and the candidates are ordered (as shown by the number inside the square) according to the distance. The line buffer restriction is not applied. In other words, the NAMVP candidates far away from a current block may have to be stored that may require a large buffer.

In the present invention, methods and apparatus to improve the coding performance of cross-component prediction by inheriting cross-component model information, in addition or model parameters, of one or more inherited candidates are disclosed.

BRIEF SUMMARY OF THE INVENTION

A method and apparatus for video coding using coding tools including one or more cross component models related modes are disclosed. According to this method, input data associated with a current block comprising a first-colour block and a second-colour block are received, wherein the input data comprises pixel data to be encoded at an encoder side or data associated with the current block to be decoded at a decoder side. A prediction candidate list comprising one or more inherited CCP (Cross-Component Prediction) candidates is determined, wherein CCM (Cross-Component Model) information associated with at least one CCP candidate is stored in addition to one or more inherited model parameters of said at least one CCP candidate. The second-colour block is encoded or decoded by using information comprising the prediction candidate list, wherein when said at least one CCP candidate is selected for the current block, prediction data for the second-colour block are generated by applying said one or more inherited model parameters of said at least one CCP candidate along with the CCM information to reconstructed first-colour block.

In one embodiment, the CCM information comprises prediction mode, model index for indicating a model shape being used, classification threshold for multi-model, down-sampling filter flag, down-sampling filtering index, number of neighbouring lines used to derive model, type of templates used to derive model, post-filtering flag, or a combination thereof.

In one embodiment, the CCM information corresponds to a prediction mode and the prediction mode is from a mode set comprising CCLM (Cross-Component Linear Model) or MMLM (Multiple Model CCLM Mode).

In one embodiment, the CCM information corresponds to a prediction mode and the prediction mode corresponds to CCCM (Convolutional Cross-Component Model) mode, and wherein the CCM information further comprises CCCM related information. In one embodiment, the CCCM related information comprises indication associated with CCCM convolution filter shape, CCCM mode index, CCCM model using non-downsampled samples, CCCM model with multiple down-sampling filters, mixed CCCM model with various terms, gradient and location based CCCM (GL-CCCM) or a combination thereof.

In one embodiment, the CCM information corresponds to a prediction mode and the prediction mode corresponds to GLM (Gradient Linear Model) mode, and wherein the CCM information further comprises GLM related information. In one embodiment, the GLM related information comprises indication associated with down-sampling filtering index, gradient down-sampled filter, GLM model with luma term or a combination thereof.

In one embodiment, the CCM information corresponds to a prediction mode and the prediction mode corresponds to cross-component multi-model mode, and wherein the CCM information further comprises cross-component multi-model mode related information. In one embodiment, the cross-component multi-model mode related information comprises indication associated with multi-model on/off flag, multi-model classification threshold or a combination thereof.

In one embodiment, at least one of said one or more inherited model parameters of said at least one CCP candidate are refined based on the CCM information. In one embodiment, a refinement process for refining said at least one of said one or more inherited model parameters of said at least one CCP candidate uses a same type of template and/or a same number of neighbouring lines as said at least one CCP candidate. In another embodiment, a refinement process for refining said at least one of said one or more inherited model parameters of said at least one CCP candidate uses a different type of template and/or a different number of neighbouring lines from said at least one CCP candidate. In one embodiment, the different type of template and/or the different number of neighbouring lines is selected according to template cost.

DETAILED DESCRIPTION OF THE INVENTION

Figure 1A:
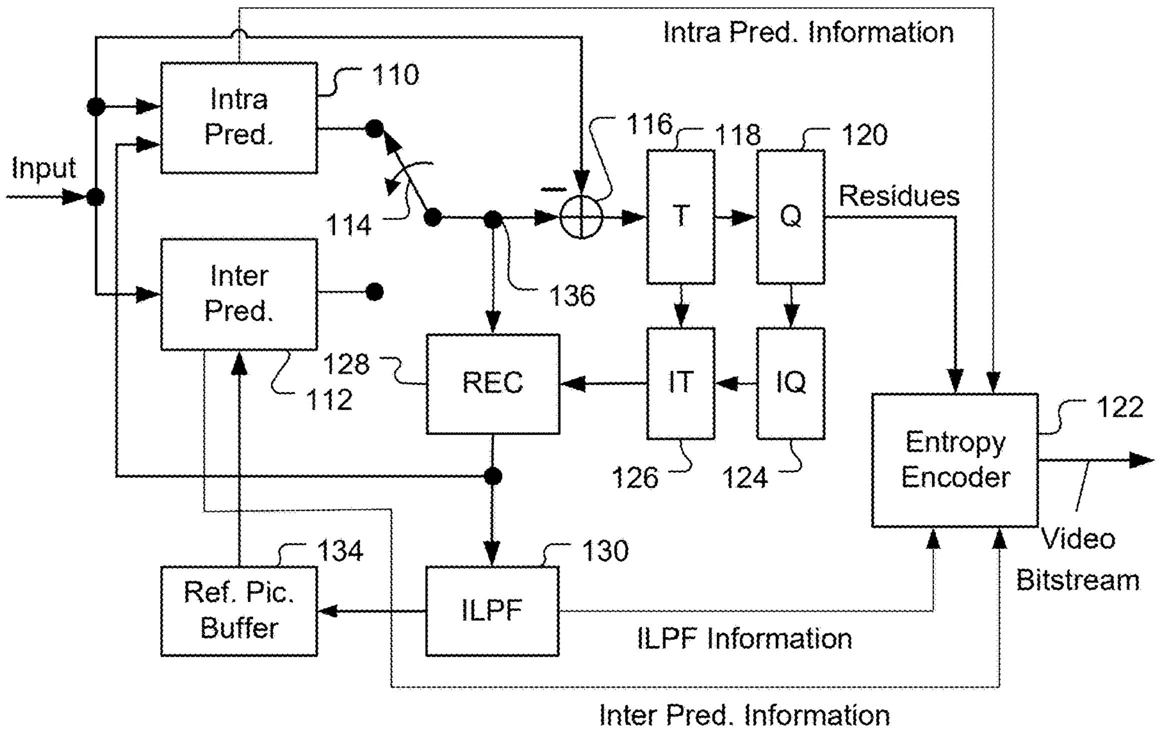
FIG. 1A illustrates an exemplary adaptive Inter/Intra video coding system incorporating loop processing.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

In order to improve the prediction accuracy or coding performance of cross-component prediction, various schemes related to inheriting cross-component models are disclosed.

Guided Parameter Set for Refining the Cross-Component Model Parameters

According to this method, the guided parameter set is used to refine the derived model parameters by a specified CCLM mode. For example, the guided parameter set is explicitly signalled in the bitstream, after deriving the model parameters, the guided parameter set is added to the derived model parameters as the final model parameters. The guided parameter set contain at least one of a differential scaling parameter (dA), a differential offset parameter (dB), and a differential shift parameter (dS). For example, equation (1) can be rewritten as:

$$pred_C(i,j)=((\alpha'\cdot rec_L'(i,j))>>s)+\beta,$$

and if dA is signalled, the final prediction is:

$$pred_C(i,j)=(((\alpha'+dA)\cdot rec_L'(i,j)>>s)+\beta.$$

Similarly, if dB is signalled, then the final prediction is:

$$pred_C(i,j)=((\alpha'\cdot rec_L'(i,j))>s)+(\beta+dB).$$

If dS is signalled, then the final prediction is:

$$pred_C(i,j)=((\alpha'\cdot rec_L'(i,j))>>(s+dS))+\beta.$$

If dA and dB are signalled, then the final prediction is:

$$pred_C(i,j)=(((\alpha'+dA)\cdot rec_L'(i,j))>>s)+(\beta+dB).$$

The guided parameter set can be signalled per colour component. For example, one guided parameter set is signalled for Cb component, and another guided parameter set is signalled for Cr component. Alternatively, one guided parameter set can be signalled and shared among colour components. The signalled dA and dB can be a positive or negative value. When signalling dA, one bin is signalled to indicate the sign of dA. Similarly, when signalling dB, one bin is signalled to indicate the sign of dB.

For another embodiment, dA and dB can be the LSB (Least Significant Bits) part of the final scaling and offset parameters. For example, if m bits are required to represent the final scaling parameters, then dA is the LSB part of the final scaling parameters, and n bits (m>n) are used to represent dA, where the MSB part (m-n bits) of the final scaling parameters are implicitly derived. In other words, for the final scaling parameters, the MSB part of the final scaling parameters is taken from the MSB part of a', and the LSB part of the final scaling parameters is from the signalled dA. Similarly, if p bits are required to represent the final offset parameters, dB is the LSB of the final offset parameters, and q bits (p>q) are used to represent dB, where the MSB part (p-q bits) of the final offset parameters are implicitly derived. In other words, for the final offset parameters, the MSB part of the final offset parameters is taken from the MSB part of B, and the LSB part of the final offset parameters is from the signalled dB.

For another embodiment, if dA is signalled, dB can be implicitly derived from the average value of neighbouring (e.g. L-shape) reconstructed samples. For example, in VVC, four neighbouring luma and chroma reconstructed samples are selected to derived model parameters. Suppose the average value of neighbouring luma and chroma samples are lumaAvg and chromaAvg, then β is derived by β=chromaAvg−(α'+dA)·lumaAvg. The average value of neighbouring luma samples (i.e., lumaAvg) can be calculated by all selected luma samples, the luma DC mode value of the current luma CB, or the average of the maximum and minimum luma samples $$\left(\text{e.g., } lumaAvg = \left(\text{Max}\left(x_A^0, x_A^1\right) + \text{Min}\left(x_B^0, x_B^1\right) + 1\right) \gg 1,\right.$$

or $$\left. lumaAvg = \left(\text{Min}\left(x_A^0, x_A^1\right) + \text{Max}\left(x_B^0, x_B^1\right) + 1\right) \gg 1\right).$$

Similarly, average value of neighbouring chroma samples (i.e., chromaAvg) can be calculated by all selected chroma samples, the chroma DC mode value of the current chroma CB, or the average of the maximum and minimum chroma samples $$\left(\text{e.g., } chromaAvg = \left(\text{Max}\left(y_A^0, y_A^1\right) + \text{Min}\left(y_B^0, y_B^1\right) + 1\right) \gg 1,\right.$$

$$\left.\text{or } chromaAvg = \left(\text{Min}\left(y_A^0, y_A^1\right) + \text{Max}\left(y_B^0, y_B^1\right) + 1\right) \gg 1\right).$$

Note, for non-4:4:4 colour subsampling format, the selected neighbouring luma reconstructed samples can be from the output of CCLM downsampling process.

For another embodiment, the shift parameter, s, can be a constant value (e.g., s can be 3, 4, 5, 6, 7, or 8), and dS is equal to 0 and no need to be signalled.

For another embodiment, in MMLM, the guided parameter set can also be signalled per model. For example, one guided parameter set is signalled for one model and another guided parameter set is signalled for another model. Alternatively, one guided parameter set is signalled and shared among linear models. Or only one guided parameter set is signalled for one selected model, and another model is not further refined by guided parameter set.

In another embodiment, the MSB part of a' is selected according to the costs of possible final scaling parameters. That is, one possible final scaling parameter is derived according to the signalled dA and one possible value of MSB for a'. For each possible final scaling parameter, the cost defined by the sum of absolute difference between neighbouring reconstructed chroma samples and corresponding chroma values generated by the CCLM model with the possible final scaling parameter is calculated and the final scaling parameter is the one with the minimum cost. In one embodiment, the cost function is defined as the summation of square error.

Inherit Neighbouring Model Parameters for Refining the Cross-Component Model Parameters The final scaling parameter of the current block is inherited from the neighbouring blocks and further refined by dA (e.g., dA derivation or signalling can be similar or the same as the method in the previous "Guided parameter set for refining the cross-component model parameters"). Once the final scaling parameter is determined, the offset parameter (e.g., $\beta$ in CCLM) is derived based on the inherited scaling parameter and the average value of neighbouring luma and chroma samples of the current block. For example, if the final scaling parameter is inherited from a selected neighbouring block, and the inherited scaling parameter is $\alpha'_{nei}$, then the final scaling parameter is ($\alpha'_{nei}$+dA). For yet another embodiment, the final scaling parameter is inherited from a historical list and further refined by dA. For example, the historical list records the most recent j entries of final scaling parameters from previous CCLM-coded blocks. Then, the final scaling parameter is inherited from one selected entry of the historical list, $\alpha'_{list}$, and the final scaling parameter is ($\alpha'_{list}$+dA). For yet another embodiment, the final scaling parameter is inherited from a historical list or the neighbouring blocks, but only the MSB (Most Significant Bit) part of the inherited scaling parameter is taken, and the LSB (Least Significant Bit) of the final scaling parameter is from dA. For yet another embodiment, the final scaling parameter is inherited from a historical list or the neighbouring blocks, but does not further refine by dA.

For yet another embodiment, after inheriting model parameters, the offset can be further refined by dB. For example, if the final offset parameter is inherited from a selected neighbouring block, and the inherited offset parameter is $\beta'_{nei}$, then the final scaling parameter is ($\beta'_{nei}$+dB). For still another embodiment, the final offset parameter is inherited from a historical list and further refined by dB. For example, the historical list records the most recent j entries of final scaling parameters from previous CCLM-coded blocks. Then, the final scaling parameter is inherited from one selected entry of the historical list, $\beta'_{list}$, and the final scaling parameter is ($\beta'_{list}$+dB).

For yet another embodiment, if the inherited neighbour block is coded with CCCM, the filter coefficients ($c_i$) are inherited. The offset parameter (e.g., $c_6 \times B$ or $c_6$ in CCCM) can be re-derived based on the inherited parameter and the average value of neighbouring corresponding position luma and chroma samples of the current block. For still another embodiment, only partial filter coefficients are inherited (e.g., only n out of 6 filter coefficients are inherited, where $1 \le n < 6$), the rest filter coefficients are further re-derived using the neighbouring luma and chroma samples of the current block.

For still another embodiment, if the inherited candidate applies GLM gradient pattern to its luma reconstructed samples, the current block shall also inherit the GLM gradient pattern of the candidate and apply to the current luma reconstructed samples.

For still another embodiment, if the inherited neighbour block is coded with multiple cross-component models (e.g., MMLM, or CCCM with multi-model), the classification threshold is also inherited to classify the neighbouring samples of the current block into multiple groups, and the inherited multiple cross-component model parameters are further assigned to each group. For yet another embodiment, the classification threshold is the average value of the neighbouring reconstructed luma samples, and the inherited multiple cross-component model parameters are further assigned to each group. Similarly, once the final scaling parameter of each group is determined, the offset parameter of each group is re-derived based on the inherited scaling parameter and the average value of neighbouring luma and chroma samples of each group of the current block. For another example, if CCCM with multi-model is used, once the final coefficient parameter of each group is determined (e.g., $c_0$ to $c_5$ except for $c_6$ in CCCM), the offset parameter (e.g., $c_6 \times B$ or $c_6$ in CCCM) of each group is re-derived based on the inherited coefficient parameter and the neighbouring luma and chroma samples of each group of the current block.

For still another embodiment, inheriting model parameters may depend on the colour component. For example, Cb and Cr components may inherit model parameters or model derivation method from the same candidate or different candidates. For yet another example, only one of colour components inherits model parameters, and the other colour component derives model parameters based on the inherited model derivation method (e.g., if the inherit candidate is coded by MMLM or CCCM, the current block also derives model parameters based on MMLM or CCCM using the current neighbouring reconstructed samples). For still another example, only one of colour components inherits model parameters, and the other colour component derives its model parameters using the current neighbouring reconstructed samples.

For still another example, if Cb and Cr components can inherit model parameters or model derivation method from different candidates. The inherited model of Cr can depend on the inherited model of Cb. For example, possible cases include but not limited to (1) if the inherited model of Cb is CCCM, the inherited model of Cr shall be CCCM; (2) if the inherit model of Cb is CCLM, the inherit model of Cr shall be CCLM; (3) if the inherited model of Cb is MMLM, the inherited model of Cr shall be MMLM; (4) if the inherited model of Cb is CCLM, the inherited model of Cr shall be CCLM or MMLM; (5) if the inherited model of Cb is MMLM, the inherited model of Cr shall be CCLM or MMLM; (6) if the inherited model of Cb is GLM, the inherited model of Cr shall be GLM.

For yet another embodiment, after decoding a block, the (CCM) information cross-component model of the current block is derived and stored for later reconstruction process of neighbouring blocks using inherited neighbours model parameter. The CCM information mentioned in this disclosure includes but not limited to prediction mode (e.g., CCLM, MMLM, CCCM), GLM pattern index, model parameters, or classification threshold. For example, even the current block is coded by inter prediction, the cross-component model parameters of the current block can be derived by using the current luma and chroma reconstructed or predicted samples. Later, if another block is predicted by using inherited neighbours model parameters, it can inherit the model parameters from the current block. For another example, the current block is coded by cross-component prediction, the cross-component model parameters of the current block are re-derived by using the current luma and chroma reconstructed or predicted samples. For another example, the stored cross-component model can be CCCM, LM_LA (i.e., single model LM using both above and left neighbouring samples to derive model), or MMLM_LA (multi-model LM using both above and left neighbouring samples to derive model). For still example, even the current block is coded by non-cross-component intra prediction (e.g., DC, planar, intra angular modes, MIP, or ISP), the cross-component model parameters of the current block are derived by using the current luma and chroma reconstructed or predicted samples. For another example, even the current block is coded by cross-component prediction, the cross-component model parameters of the current block are re-derived by using the current luma and chroma reconstructed or predicted samples. Later the re-derived model parameters are combined with the original cross-component models which is used in reconstructing the current block. For combining with the original cross-component models, it can use the model combination methods mentioned in sections entitled: Models Generated Based on Other Inherited Models and entitled: Inheriting Multiple Cross-Component Models. For example, assume the original cross-component model parameters are $$\{c_0^0, c_1^0, \ldots, c_{M-1}^0\},$$

and the re-derived cross-component model parameters are $$\{c_0^1, c_1^1, \ldots, c_{M-1}^1\},$$

The final cross-component model is $$\{(1-\alpha)\times c_0^0+\alpha\times c_0^1, (1-\alpha)\times c_1^0+\alpha\times c_1^1, \ldots, (1-\alpha)\times c_{M-1}^0+\alpha\times c_{M-1}^1\},$$

where $\alpha$ is a weighting factor which can be predefined or implicitly derived by neighbouring template cost.

For another embodiment, when inheriting a cross-component model from a neighbour merge candidate that was coded by a cross-component mode (e.g. CCLM and CCCM, . . . ), a flag can be signalled to indicate/select if the re-derived model is used. If the flag is 0, the cross-component model used to encode the neighbour merge candidate is inherited. If the flag is 1, the cross-component model re-derived based on the luma and chroma reconstructed or predicted samples of the neighbour merge candidate is inherited.

Figure 19:
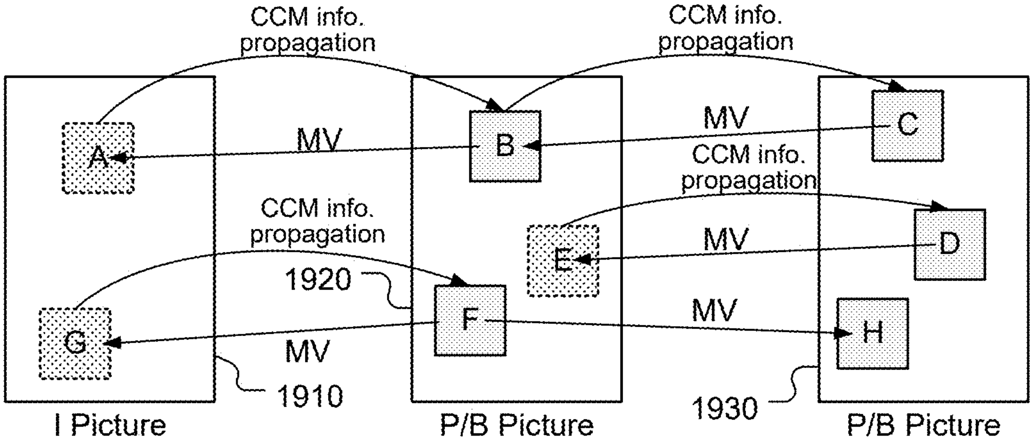
FIG. 19 illustrates examples of CCM information propagation, where the blocks with dash line (i.e., A, E, G) are coded in cross-component mode (e.g., CCLM, MMLM, GLM, CCCM).

For still another example, when the current slice is a non-intra slice (e.g., P slice or B slice), a cross-component model of the current block is derived and stored for later reconstruction process of neighbouring blocks using inherited neighbours model parameter. For still another embodiment, when the current block is inter-coded, the CCM information of the current inter-coded block is derived by copying the CCM information from its reference block that has CCM information in a reference picture, located by the motion information of the current inter-coded block. For example, as shown in FIG. 19, the block B in a P/B picture 1920 is inter-coded, then the CCM information of block B is obtained by copying CCM information from its referenced block A in an I picture 1910. It should be noted that the current block can also copy the CCM information from an intra-coded block in an P/B picture. For example, as shown in the FIG. 19, the block D in a P/B picture 1930 is inter-coded, then the CCM information of block D is obtained by copying CCM information from its referenced block E that is intra-coded in the P/B picture 1920. For still another embodiment, if the reference block in a reference picture is also inter-coded, the CCM information of the reference block is obtained by copying the CCM information from another reference block in another reference picture. For example, as shown in the FIG. 19, the current block C in a current P/B picture 1930 is inter-coded and its referenced block B is also inter-coded, due to the CCM information of block B is obtained by copying the CCM information from block A, then the CCM information of block A is also propagated to the current block C. For still another embodiment, when the current block is inter-coded with bi-directional prediction, if one of its reference blocks is intra-coded and has CCM information, the CCM information of the current block is obtained by copying the CCM information from its intra-coded reference block in a reference picture. For example, suppose block F is inter-coded with bi-prediction and has reference blocks G and H. Block G is intra-coded and has CCM information. The CCM information of block F is obtained by copying the CCM information from the block G coded in CCM mode. For still another embodiment, when the current block is inter-coded with bi-directional prediction, the CCM information of the current block is the combination of the CCM models of its reference blocks (as the method mentioned in section entitled: Inheriting Multiple Cross-Component Models).

When deriving cross-component models for the current block by using the current luma and chroma reconstructed or predicted samples, in one embodiment, if the current derived model error is greater than a threshold, the current derived model is discarded and not stored. For example, it can input the current luma reconstructed samples to the model, calculate the distortion between the model output and the current chroma reconstructed samples, and then the calculated distortion is normalized by the current block size or number of samples used in calculating the distortion. If the normalized distortion is greater than or equal to a threshold, the current derived model is discarded and not stored.

Whether to derive cross-component models for the current block or not can depend on the current block size or area. For example, for small blocks (e.g., block width/height less than or equal to a threshold, or block area less than or equal a threshold), it is not allowed to derive cross-component models. For another example, for large blocks (e.g., block width/height greater than or equal to a threshold, or block area greater than or equal a threshold), it is not allowed to derive cross-component models.

Inherit CCM Information

In one embodiment, the cross-component model (CCM) information of inherited cross-component model can be stored together with the inherited model parameters. As mentioned earlier in this disclosure, the CCM information includes, but not limited to prediction mode (e.g., CCLM, MMLM, CCCM), model index for indicating which model shape is used in convolutional model, classification threshold for multi-model, down-sampling filter flag, down-sampling filtering index, number of neighbouring lines used to derive model, types of templates used to derive model, post-filtering flag or model parameters.

In one embodiment, CCLM model can be inherited. In addition to storing model parameters, a prediction mode can be stored in the CCM information for indicating that the inherited model is a CCLM model.

In another embodiment, CCLM model with non-linear term can be inherited. In addition to storing model parameters, a prediction mode can be stored in the CCM information for indicating that the inherited model is a CCLM model with a non-linear term.

In one embodiment, CCCM model can be inherited. In addition to storing model parameters, a prediction mode can be stored in the CCM information for indicating that the inherited model is a CCCM model. The luma offset and the chroma offset used for adjusting the input of CCCM model can also be stored in the CCM information.

In another embodiment, CCCM model with different convolution filter shape can be inherited. In addition to model parameters and prediction mode, a CCCM mode index can also be stored in CCM information for indicating which convolution filter shape is used for the inherited CCCM model. For example, a CCCM model with different convolution filter shape can only contain the spatial terms in the horizontal direction. For another example, a CCCM model with different convolution filter shape can only contain the spatial terms in vertical direction. For another example, a CCCM model with different convolution filter shape can only contain the spatial terms in diagonal direction. For another example, a CCCM model with different convolution filter shape can only contain the spatial terms in anti-diagonal direction. For another example, a CCCM model with different convolution filter shape can contain the X-shape spatial terms.

In another embodiment, CCCM model using non-downsampled samples can be inherited. In addition to storing model parameters, a prediction mode can be stored in the CCM information for indicating that the inherited model is a CCCM model using non-downsampled samples.

In another embodiment, CCCM model with multiple down-sampling filter can be inherited. In addition to storing model parameters, a prediction mode can be stored in the CCM information for indicating that the inherited model is a CCCM model with multiple down-sampling filter, and a model index can be also stored in CCM information for indicating which variant of CCCM model with multiple down-sampling filter is inherited.

In another embodiment, a mixed CCCM model consist of various terms (e.g. spatial term, gradient term, location term, non-linear term and bias term) can be inherited. The gradient term can be calculated in either the downsampled domain or the non-downsampled domain. The location term can be calculated with respect to the top-left coordinates of the current block or the picture. In addition to storing model parameters, a prediction mode can be stored in the CCM information for indicating that the inherited model is a mixed CCCM model consist of various terms. If there are multiple types of mixed CCCM models, a model index can also be stored in the CCM information for indicating which type of mixed CCCM model is inherited. For example, gradient and location based CCCM (GL-CCCM) proposed in JVET-AB0119 (Ramin G. Youvalari, et al., "Non-EE2: Gradient and location based convolutional cross-component model (GL-CCCM) for intra prediction", Joint Video Exploration Team (JVET) of ITU-T SG 16 WP 3 and ISO/IEC JTC 1/SC 29/WG 11, 28th Meeting, Mainz, DE, 20-28 Oct. 2022, Document: JVET-AB0119) is a mixed CCCM model which consist of one spatial term in centre position, two gradient terms for the horizontal direction and vertical direction, two location terms X and Y for the relative horizontal location and relative vertical location, one non-linear term and one bias term. In addition to storing model parameters, a prediction mode can be stored in the CCM information for indicating that the inherited model is a GL-CCCM model.

In one embodiment, the model associated with GLM mode can be inherited. In this disclosure, the model associated with GLM is also referred as the GLM model. In addition to storing model parameters, a prediction mode can be stored in the CCM information for indicating that the inherited model is a GLM model, and a down-sampling filtering index can be also stored in CCM information for indicating which gradient down-sampled filter is used for the inherited GLM model.

In another embodiment, GLM model with luma term can be inherited. In addition to storing model parameters, a prediction mode can be stored in the CCM information for indicating that the inherited model is a GLM model with luma term, and a down-sampling filtering index can be also stored in CCM information for indicating which gradient down-sampled filter is used for the inherited GLM model with luma term.

In one embodiment, any kind of cross-component multi-model can be inherited. In addition to storing model parameters and prediction mode, a multi-model on/off flag can be stored in the CCM information for indicating whether the inherited CCM model is a multi-model or not. If the multi-model on/off flag is true, the multi-model classification threshold is also stored in the CCM information.

In one embodiment, the CCM information can include information to indicate how the inherited model is derived. For example, the CCM information can include the number of neighbouring lines used to derive the cross-component model and/or the types of templates used to derive model. For example, a set of templates can be used to derive a CCCM model. The set of templates include template with different positions, sizes, and shapes. The CCM information can store the index of the template that the inherited CCCM model was derived based on. For example, the inherited CCCM model can be derived based on a top-only template, or a left-only template or a left-and-top template. For another example, the inherited CCCM model can be derived based on a 6-line template or a 2-line template.

In one embodiment, a post-filter flag can be stored in the CCM information. This information describes how the inherited model is used in the block the inherited model is from. If the post-filter flag is on, this indicates a filter is applied to the prediction of the block the inherited model is from.

Refinement of Inherited Model Parameters

In one embodiment, the inherited model parameters can be further refined based on the inherited CCM information. The inherited CCM information can include how the inherited model is derived, such as the type of template and/or the number of neighbouring lines used to derive the model. The refined parameters are derived based on local information. The refinement process can follow how the inherited model was derived and use the same type of template and/or the same number of neighbouring lines. For example, if the inherited model is CCLM and was derived based on the left-only template (i.e., the inherited model being CCLM_L), the offset parameter $\beta$ can be derived from the average value of neighbouring left-template reconstructed samples of the current block. For example, if the inherited model is CCLM and was derived based on top-only template (i.e., the inherited model being CCLM_T), the offset parameter $\beta$ can be derived from the average value of neighbouring top-template reconstructed samples of the current block. For another example, if the inherited model is CCCM and was derived with 2-line template. The offset value (e.g. $c_6$ in CCCM) can be re-derived based on the 2-line template reconstructed samples of the current block. For another example, if the inherited model is a multi-model (MMLM, CCCM with multi-model) and was derived based on left-only template, the classification threshold can be re-derived based on the left-template reconstructed samples of the current block.

In one embodiment, the inherited model parameters are further refined with different types of templates and/or different numbers of lines, and the final model parameters are determined by the template cost. The template cost is computed by applying the candidate refined model parameters on the neighbouring template to predict the template samples and compute the differences (e.g. SAD or SATD) between the predicted and the reconstructed samples. For example, if the inherited model is CCLM, the refined offset parameter $\beta'_L$, $\beta'_T$, $\beta'_{LT}$ is derived using the left-template, top-template and left-top template of the reconstructed samples of the current block respectively. If the template cost of applying $\beta'_L$ is the minimum among $\beta'_L$, $\beta'_T$, $B'_{LT}$, then $\beta'_L$ is chosen as the final offset parameter.

In another embodiment, the inherited model parameters can be further refined by a pre-defined value. The template cost is used to determine if the inherited model parameters are further refined. The template cost is computed by applying the candidate refined model parameters on the neighbouring template to predict the template samples and compute the differences (e.g. SAD or SATD) between the predicted and the reconstructed samples. For example, for CCCM mode, for each inherited model parameter $c_i$, the value is refined by $dc_i$, and the template costs of applying $c_i+dc_i$ and $c_i$ are compared to determine which is the final model parameter value.

Inherit Spatial Neighbouring Model Parameters

For another embodiment, the inherited model parameters can be from a block that is an immediate neighbouring block. The models from blocks at pre-defined positions are added into the candidate list in a pre-defined order. For example, the pre-defined positions can be the positions depicted in FIG. 14, and the pre-defined order can be $B_0$, $A_0$, $B_1$, $A_1$ and $B_2$, or $A_0$, $B_0$, $B_1$, $A_1$ and $B_2$.

For still another embodiment, the pre-defined positions include the positions at the immediate above (W>>1) or ((W>>1)−1) position if W is greater than or equal to TH, and the positions at the immediate left (H>>1) or ((H>>1)−1) position if His greater than or equal to TH, where W and H are the width and height of the current block, TH is a threshold value which can be 4, 8, 16, 32, or 64.

Figure 14:
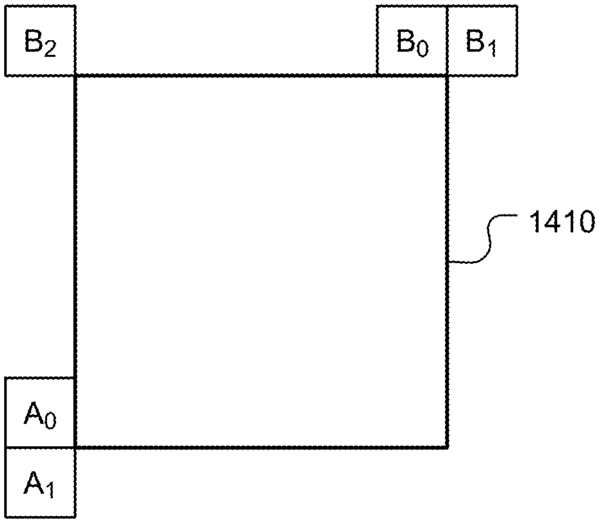
FIG. 14 illustrates the neighbouring blocks used for deriving spatial merge candidates for VVC.
Figure 15:
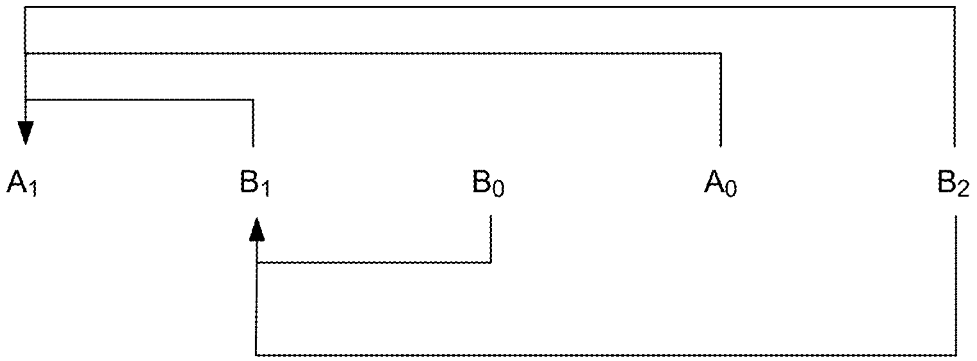
FIG. 15 illustrates the possible candidate pairs considered for redundancy check in VVC.
Figure 16:
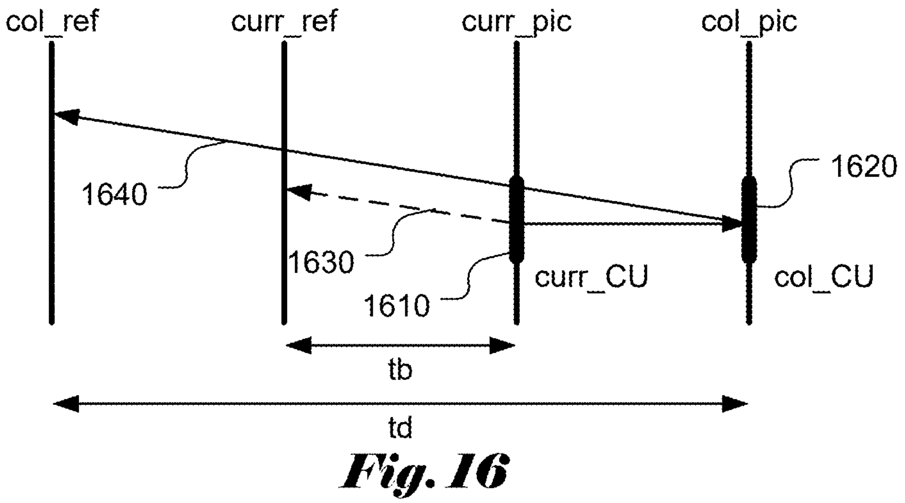
FIG. 16 illustrates an example of temporal candidate derivation, where a scaled motion vector is derived according to POC (Picture Order Count) distances.
Figure 17:
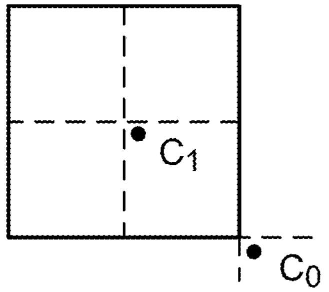
FIG. 17 illustrate the positions for the temporal candidate selected between candidates $C_0$ and $C_1$.

For still another embodiment, the maximum number of inherited models from spatial neighbours are smaller than the number of pre-defined positions. For example, if the pre-defined positions are as depicted in FIG. 14, there are 5 pre-defined positions. If pre-defined order is $B_0$, $A_0$, $B_1$, $A_1$ and $B_2$, and the maximum number of inherited models from spatial neighbours is 4, the model from $B_2$ is added into the candidate list only when one of preceding blocks is not available or is not coded in cross-component model.

Inheriting Temporal Neighbouring Model Parameters

Figure 20:
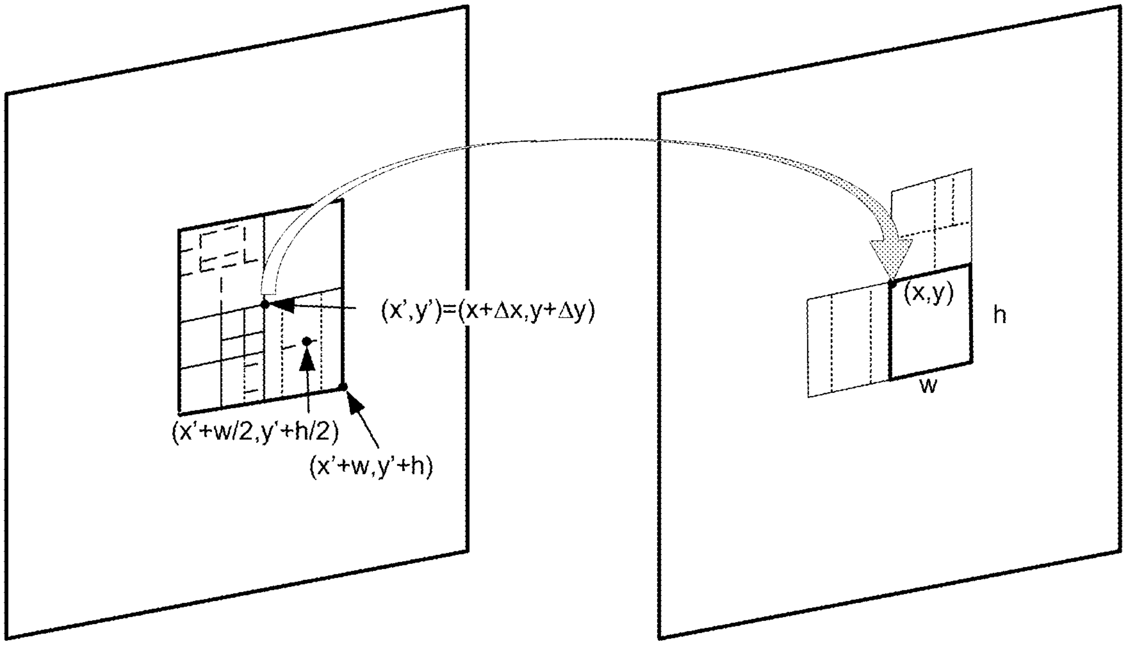
FIG. 20 illustrates an example of inheriting temporal neighbouring model parameters.

For still another embodiment, if the current slice/picture is a non-intra slice/picture, the inherited model parameters can be from the block in the previous coded slices/pictures. For example, as shown in the FIG. 20, the current block position is at (x, y) and the block size is w×h. The inherited model parameters can be from the block at position (x', y'), (x', y'+h/2), (x'+w/2, y'), (x'+w/2, y'+h/2), (x'+w, y'), (x', y'+h), or (x'+w, y'+h) of the previous coded slices/picture, where x'=x+Δx and y'=y+Δy. In one embodiment, if the prediction mode of the current block is intra, Δx and Δy are set to 0. If the prediction mode of the current block is inter prediction, Δx and Δy are set to the horizontal and vertical motion vector of the current block. In another embodiment, if the current block is inter bi-prediction, Δx and Δy are set to the horizontal and vertical motion vectors in reference picture list 0. In still another embodiment, if the current block is inter bi-prediction, Δx and Δy are set to the horizontal and vertical motion vectors in reference picture list 1.

For still another embodiment, if the current block is inter bi-prediction, the inherited model parameters can be from the block in the previous coded slices/pictures in the reference lists. For example, if the horizontal and vertical motion vector in reference picture list 0 is $\Delta x_{L0}$ and $\Delta y_{L0}$, the motion vector can be scaled to other reference pictures in the reference list 0 and 1. If the motion vector is scaled to the $i^{th}$ reference picture in the reference list 0 as $(\Delta x_{L0,\ i0}, \Delta y_{L0,\ i0})$. The model can be from the block in the $i^{th}$ reference picture in the reference list 0, and Δx and Δy are set to $(\Delta x_{L0,\ i0}, \Delta y_{L0,\ i0})$. For another example, if the horizontal and vertical motion vector in reference picture list 0 is $\Delta x_{L0}$ and $\Delta y_{L0}$ and the motion vector is scaled to the $i^{th}$ reference picture in the reference list 1 as $(\Delta x_{L0,\ i1}, \Delta y_{L0,\ i1})$. The model can be from the block in the $i^{th}$ reference picture in the reference list 1, and Δx and Δy are set to $(\Delta x_{L0,\ i1}, \Delta y_{L0,\ i1})$.

Inherit Non-Adjacent Spatial Neighbouring Models

Figure 18:
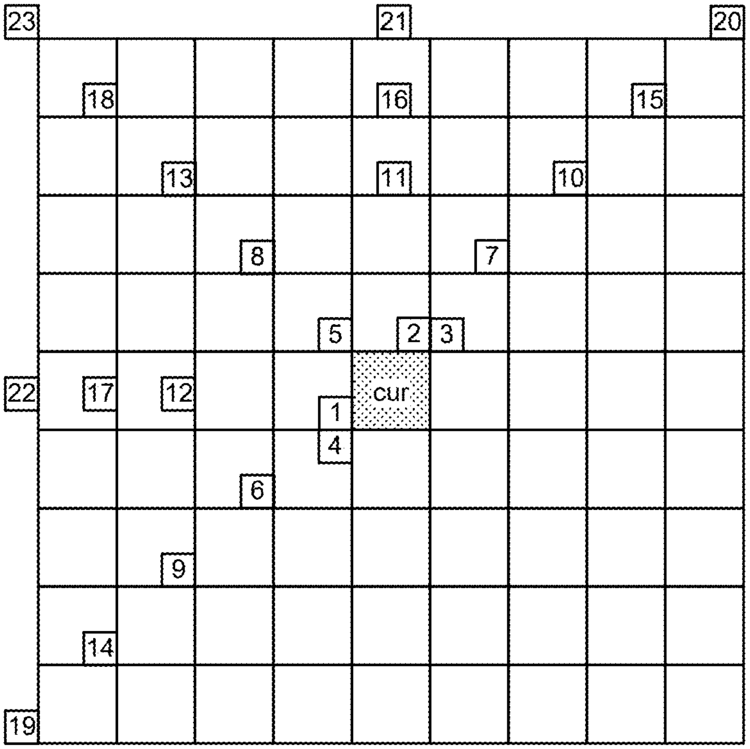
FIG. 18 illustrates an exemplary pattern of the non-adjacent spatial merge candidates.

For another embodiment, the inherited model parameters can be from blocks that are spatial neighbouring blocks. The models from blocks at pre-defined positions are added into the candidate list in a pre-defined order. For example, the pattern of the positions and order can be as the pattern depicted in FIG. 18, where the distance between each position is the width and height of current coding block. For another embodiment, the distance between the positions that are closer to the current encoding block is smaller than the positions that are further away from the current block.

Figure 21A:
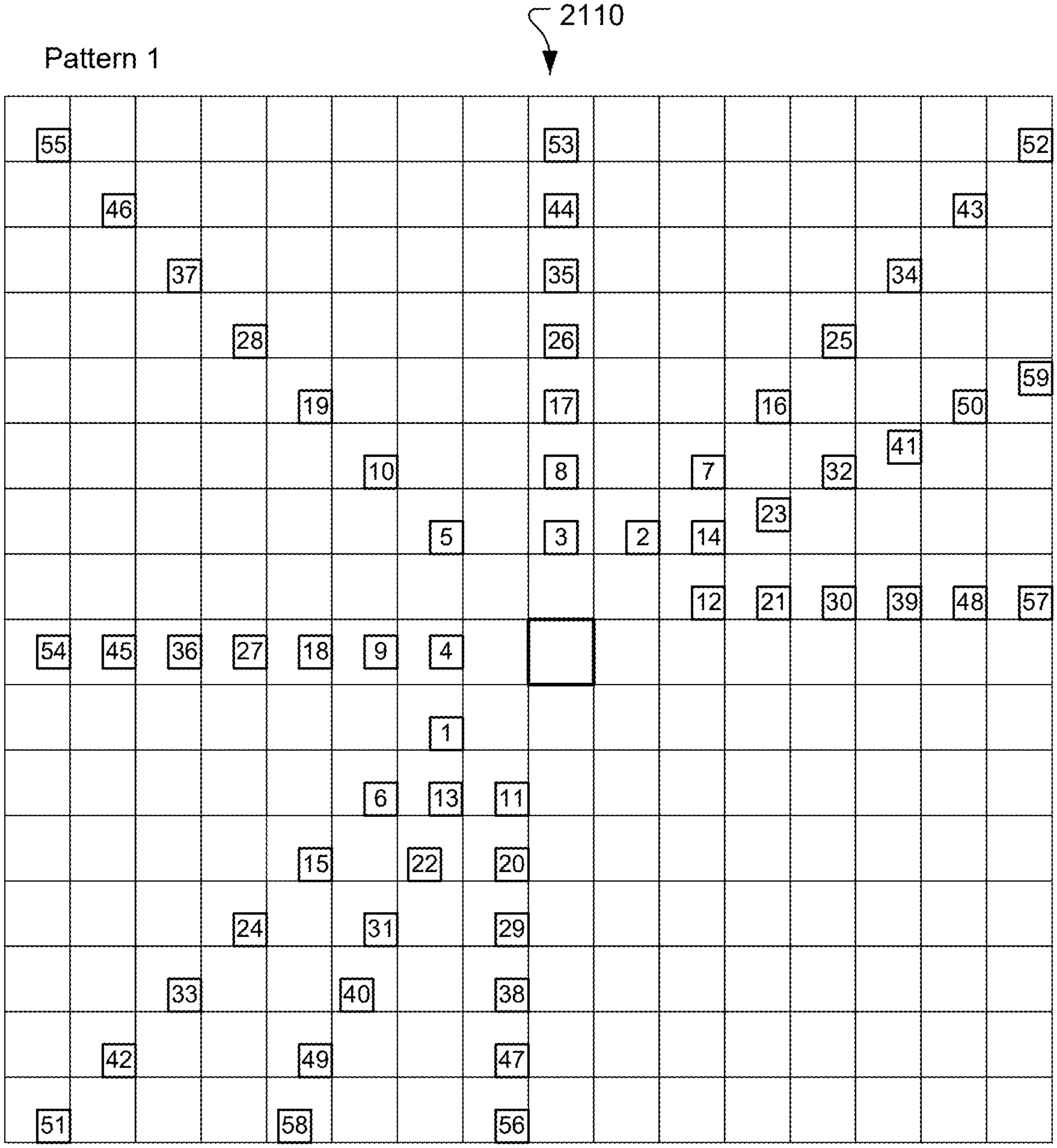
FIGS. 21A-B illustrates two search patterns for inheriting non-adjacent spatial neighbouring models.
Figure 21B:
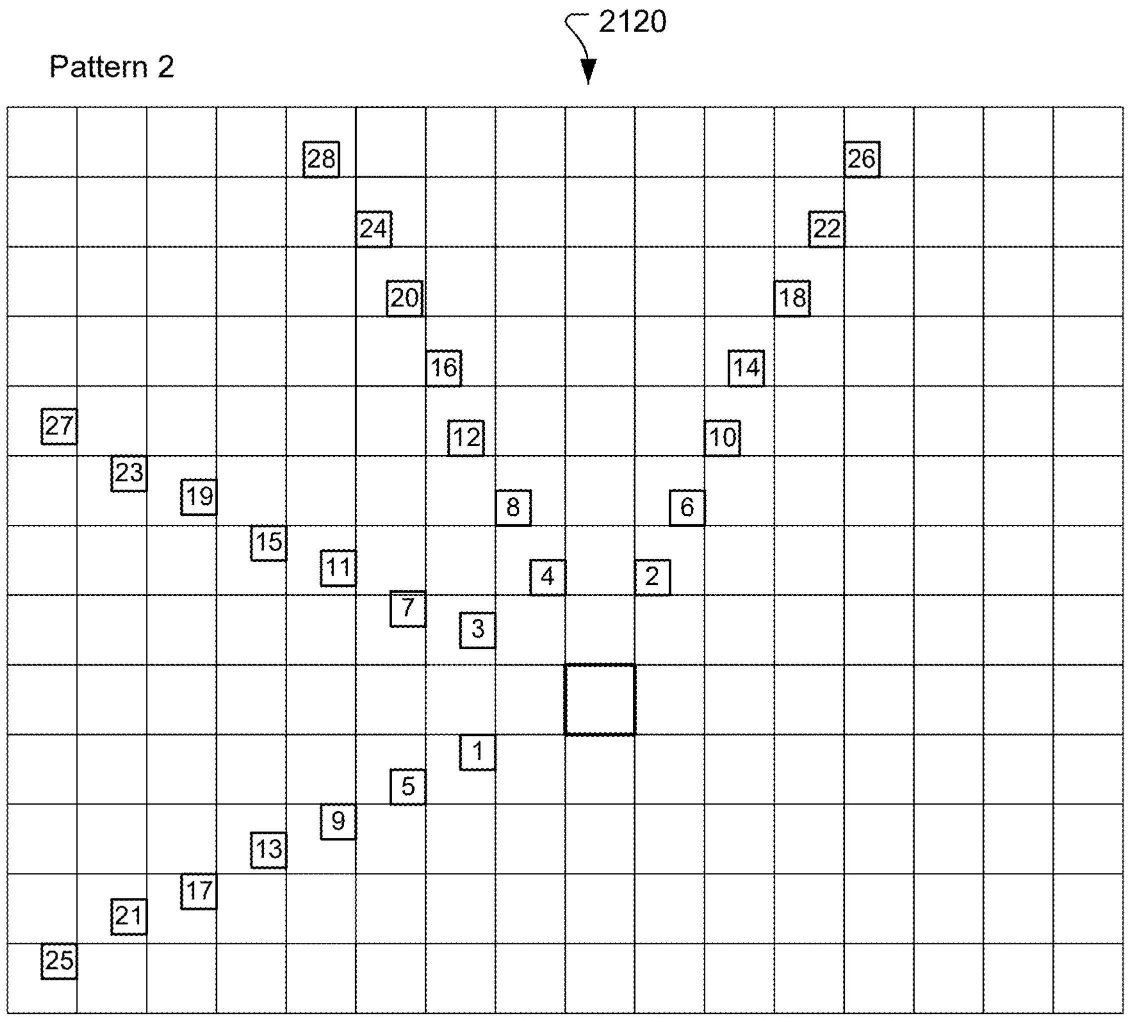

For still another embodiment, the maximum number of inherited models from non-adjacent spatial neighbours are smaller than the number of pre-defined positions. For example, if the pre-defined positions are as depicted in FIGS. 21A-B, where two patterns (pattern 2110 in FIG. 21A and pattern 2120 in FIG. 21B) are shown. If the maximum number of inherited models from non-adjacent spatial neighbours is N, the search pattern 2 is used only when the number of available models from search pattern 1 is smaller than N.

Inherit Model Parameters from History Table

In one embodiment, the inherited model parameters can be from a cross-component model history table. The cross-component models in the history table can be added into the candidate list according to a pre-defined order. In one embodiment, the adding order of historical candidates can be from the beginning of the table to the end of the table. In another embodiment, the adding order of historical candidates can be from a certain pre-defined position to the end of the table. In another embodiment, the adding order of historical candidates can be from the end of the table to the beginning of the table. In another embodiment, the adding order of historical candidates can be from a certain pre-defined position to the beginning of the table. In another embodiment, the adding order of historical candidates can be in an interleaved manner (e.g., the first added is from the beginning of the table, the second added candidate from the end of the table and so on).

In one embodiment, single cross-component model history table can be maintained for storing the previous cross-component model, and the cross-component model history table can be reset at the start of the current picture, current slice, current tile, every M CTU rows or every N CTUs, where N and M can be any value greater than 0. In another embodiment, the cross-component model history table can be reset at the end of the current picture, current slice, current tile, current CTU row or current CTU.

In another embodiment, one picture can be divided into multiple regions, and for each region, a history table is kept. The history table 0 and one additional history table will be updated during the encoding/decoding process. The additional history table can be determined by the current position. For example, if the current CU is located in the second region, the additional history table to be updated is history table 2.

In another embodiment, multiple history tables are used for different updated frequencies. For example, the first history table is updated every CU, the second history table is updated every two CUs, the third history table is updated every four CUs and so on.

In another embodiment, multiple history tables are used for storing different types of cross-component models. For example, the first history table is used for storing single model, and the second history table is used for storing multi-model. For another example, the first history table is used for storing a gradient model, and the second history table is used for storing a non-gradient model. For another example, the first history table is used for storing a simple linear model (e.g., y=ax+b), and the second history table is used for storing a complicated model (e.g., CCCM).

In another embodiment, multiple history tables are used for different reconstructed luma intensity. For example, if the average of reconstructed luma samples in the current block is greater than a pre-defined threshold, the cross-component model will be stored in the first history table; otherwise, the cross-component model will be stores in the second history table. In another embodiment, multiple history tables are used for different reconstructed chroma intensities. For example, if the average of neighbouring reconstructed chroma samples in the current block is greater than a pre-defined threshold, the cross-component model will be stores in the first history table; otherwise, the cross-component model will be stored in the second history table.

In one embodiment, when adding historical candidates from multiple history tables to the candidate list, the adding order can be from the beginning of the certain table to the end of the certain table, and then add the next history table in the same order or in a reversed order. In another embodiment, the adding order can be from the end of the certain table to the beginning of the certain table, and then add the next history table in the same order or in a reversed order. In another embodiment, the adding order can be from the certain pre-defined position of the certain table to the end of the certain table, and then add the next history table in the same order or in a reversed order. In another embodiment, the adding order can be from the certain pre-defined position of the certain table to the beginning of the certain table, and then add the next history table in the same order or in a reversed order. In another embodiment, the adding order of historical candidates can be in an interleaved manner in a certain history table (e.g., the first added candidate from the beginning of the certain history table, the second added candidate from the end of the certain history table and so on), and then add the next history table in the same order or in a reversed order.

In another embodiment, the adding order can be from the beginning of each history table to the end of each history table. In another embodiment, the adding order can be from the end of each history table to the beginning of each history table. In another embodiment, the adding order can be from the certain pre-defined position of each history table to the end of each history table. In another embodiment, the adding order can be from the certain pre-defined position of each history table to the beginning of each history table. In another embodiment, the adding order of historical candidates can be in an interleaved manner in each certain history table (e.g., the first added candidates from the beginning of all history table, the second added candidates from the end of all history table and so on).

In one embodiment, multiple cross-component model history tables are used, but not all history tables will be used for creating the candidate list. Only history tables whose regions are close to the region of current block can be used to create the candidate list.

In one embodiment, if the historical candidates are used, the range for selecting non-adjacent candidates can be reduced by using a smaller distance between each position of non-adjacent candidate. In another embodiment, if the historical candidates are used, the number of non-adjacent candidates can be reduced by measuring the distance from the left-top position of the current block to the candidate position, and then exclude the candidate with the distance greater than a pre-defined threshold. In another embodiment, if the historical candidates are used, the number of non-adjacent candidates can be reduced by skipping the candidates that are not located in the same region. In another embodiment, if the historical candidates are used, the number of non-adjacent candidates can be reduced by skipping the candidates that are not located in the neighbouring regions. The range of neighbouring regions is pre-defined, and it can be M by N regions, where M and N can be any value greater than 0. In another embodiment, if the historical candidates are used, the range for selecting non-adjacent candidates can be reduced by skipping the second search pattern.

Figure 22A:
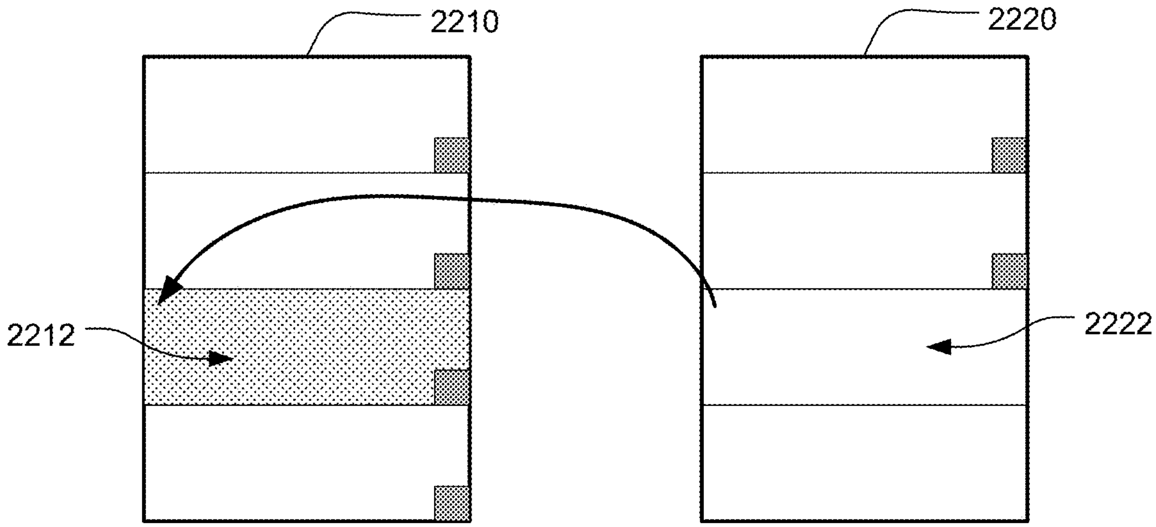
FIGS. 22A-B illustrate examples for constructing the history table of the current region from the history table of the region having the same beginning geometric position of the current region (FIG. 22A) or from the history table of the region containing the centre geometric position of the current region (FIG. 22B).
Figure 22B:
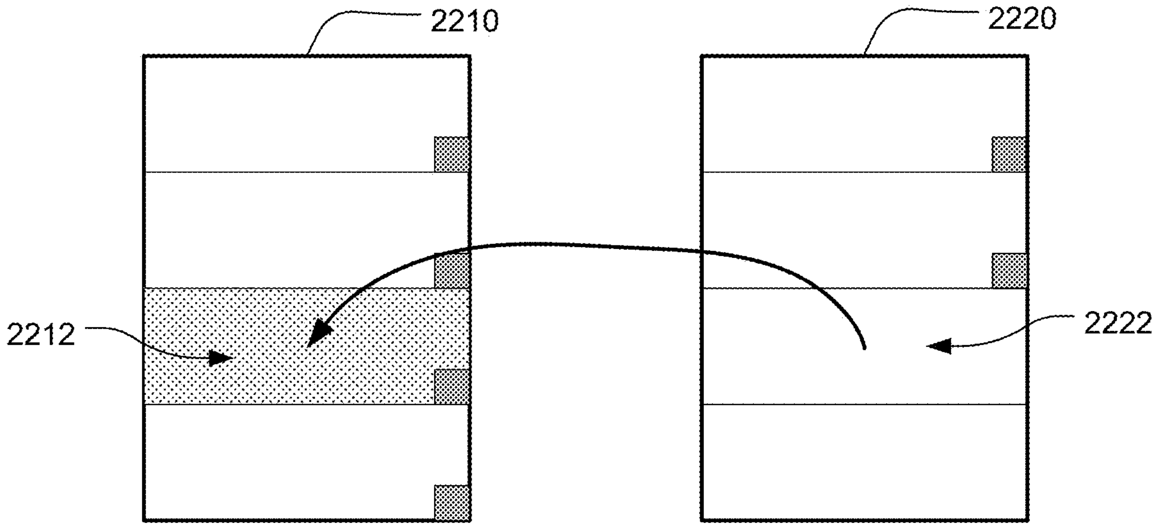

In another embodiment, one picture can be divided into multiple regions, and at least one history table is kept in each region. For a region of the current picture, it can use or combine the history tables of one or multiple regions in the previous coded pictures as the initial history table. For example, if a picture is divided into N regions, it can implicitly or explicitly select the history table from one of N regions in the previous coded pictures as the initial history table. The index of one of N regions can be signalled or implicitly derived from the corresponding region in the previous coded pictures. As shown in FIGS. 22A-B, where the current picture 2220 is a P/B coded picture and the previous picture 2210 is an Intra coded picture. Each picture is divided into 4 regions as shown in 4 rectangular boxes. According to an embodiment of the present invention, the corresponding region in the previous coded pictures can be the region 2212 having the same beginning geometric position as the current region 2222 as shown in FIG. 22A or containing the centre geometric position of the current region 2222 as shown in FIG. 22B. For another example, it can combine more than one history tables in the previous coded regions/pictures to construct the history table of the current region (e.g., the method in the section entitled: Inheriting candidates from the candidates in the candidate list of neighbours).

The Available Region of Non-Adjacent Spatial Candidates

To limit the requirement buffer/storage resource, the available range for including non-adjacent spatial candidates should be constrained. In one embodiment, only the cross-component model (CCM) information in the current CTU can be referenced by the non-adjacent spatial candidate. In another embodiment, only the CCM information in the current CTU or left M CTUs can be referenced by the non-adjacent spatial candidate. M can be any integer larger than 0. In another embodiment, only the CCM information in the current CTU row can be referenced by the non-adjacent spatial candidate. In another embodiment, only the to-be referenced position within the current CTU row or above N CTU rows can be referenced. N can be any integer larger than 0. Note, the CCM information mentioned in this disclosure includes but not limited to prediction mode (e.g., CCLM, MMLM, CCCM), GLM pattern index, model parameters, or classification threshold.

In another embodiment, the CCM information in the current CTU, the current CTU row, the current CTU row+above N CTU rows, the current CTU+left M CTUs, or the current CTU+above N CTU rows+left M CTUs can be referenced without limits. Furthermore, the CCM information in other regions can only be referenced by a larger pre-defined unit. For example, the CCM information in the current CTU row is stored within a 4×4 grid, and for other CCM information outside the current CTU row is stored within a 16×16 grid. In other words, one 16×16 region only needs to store one CCM information, so the to-be referenced position shall be rounded to the 16×16 grid, or changed to the nearest position of 16×16 grid.

Figure 23:
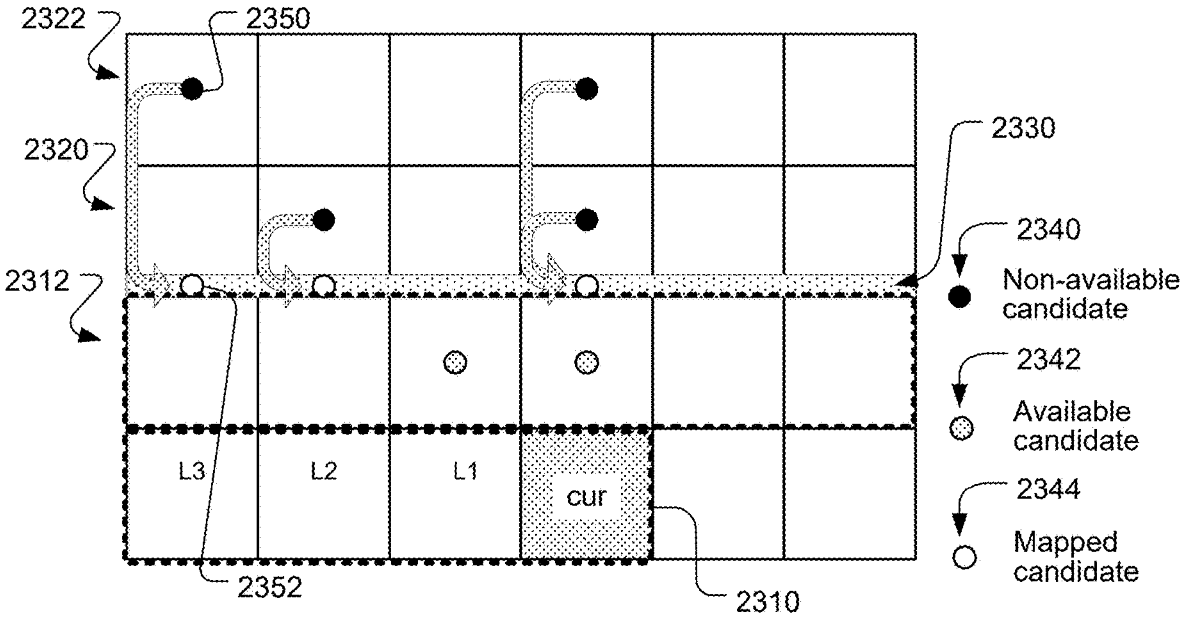
FIG. 23 illustrates an example to map motion information for the to-be referenced positions in a non-available region to pre-defined positions, where the pre-defined positions are located at one line above the above-first CTU row.

In another embodiment, the CCM information in the current CTU row, or the current CTU row+M CTU rows can be referenced without limits, and for the to-be referenced positions in the above CTU row, the positions will be mapped to one line above of current CTU, or the current CTU row+M CTU rows for referencing. This design can preserve most of the coding efficiency and doesn't increase buffer by much for storing the CCM information of above CTU rows. For example, the CCM information in the current CTU row (2310) and the first CTU row above (2312) can be referenced without limits; and for the to-be referenced positions in the above-second (2320), above-third (2322), above-fourth CTU row, and so on, the positions will be mapped to one line (2330) above the above-first CTU row (as shown in FIG. 23). In FIG. 23, a dark circle indicates a non-available candidate 2340, a dot-filled circle indicates an available candidate 2342 and an empty circle indicates a mapped candidate 2344. For example, the non-available candidate 2350 in the above-third (2322) CTU row is mapped to an available candidate 2352 in one line (2330) above the above-first CTU row (2312).

In the above example, the region that can be referenced without limits is close to the current CTU (e.g. the current CTU row or the above-first CTU row). However, the region according to the present invention is not limited to the exemplary region shown above. The region can be larger or smaller than the example shown above. In general, the region can be limited to be within one or more pre-define distances in a vertical direction, a horizontal direction or both from the current CTU. In the above example, the region is limited to 1 CTU height in the above vertical direction, which can be extended to 2 or 3 CTU heights if desired. In the case that left M CTUs are used, the limit is M CTU width for the current CTU row. The horizontal position of a to-be referenced position and the horizontal position of a mapped pre-defined position can be the same (e.g. position 2350 and position 2352 in the same horizontal position). However, other horizontal position may also be used.

Figure 24:
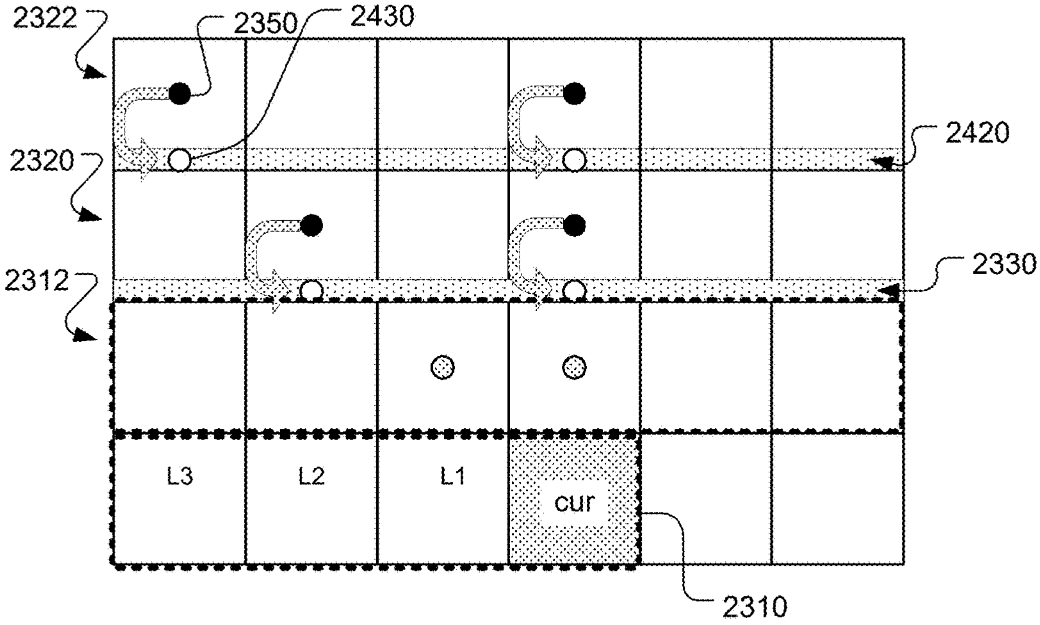
FIG. 24 illustrates an example to map motion information for the to-be referenced positions in a non-available region to pre-defined positions, where the pre-defined positions are located at the bottom line of respective CTU rows.

In another embodiment, the CCM information in the current CTU row, or the current CTU row+M CTU rows can be referenced without limits. Furthermore, for the to-be referenced positions in the above CTU row, the positions will be mapped to the last line of the corresponding CTU row for referencing. For example, as shown in FIG. 24, the CCM information in the current CTU row (2310) and the first CTU row (2312) above can be referenced without limits, and for the to-be referenced positions in the above-second CTU row (2320), the positions will be mapped to the bottom line (2330) of the above-second CTU row (2320). For the to-be referenced positions in above third CTU row (2322), the positions will be mapped to the bottom line (2420) of the above-third CTU row (2322). For example, the non-available candidate 2350 in the above-third CTU row (2322) is mapped to a mapped candidate 2430 in the bottom line (2420) of the above-third CTU row (2322). The legend for the candidate types (i.e., 2340, 2342 and 2344) of FIG. 24 is the same as that in FIG. 23. In this example, the unconstrained region may include one or more above CTU rows (e.g., 1 CTU in FIG. 24). The above-second CTU row is above the unconstrained region. The above-third CTU row is also referred as an above-above CTU row since it is above the CTU row (i.e., the above-second CTU row) above the unconstrained region.

Figure 25:
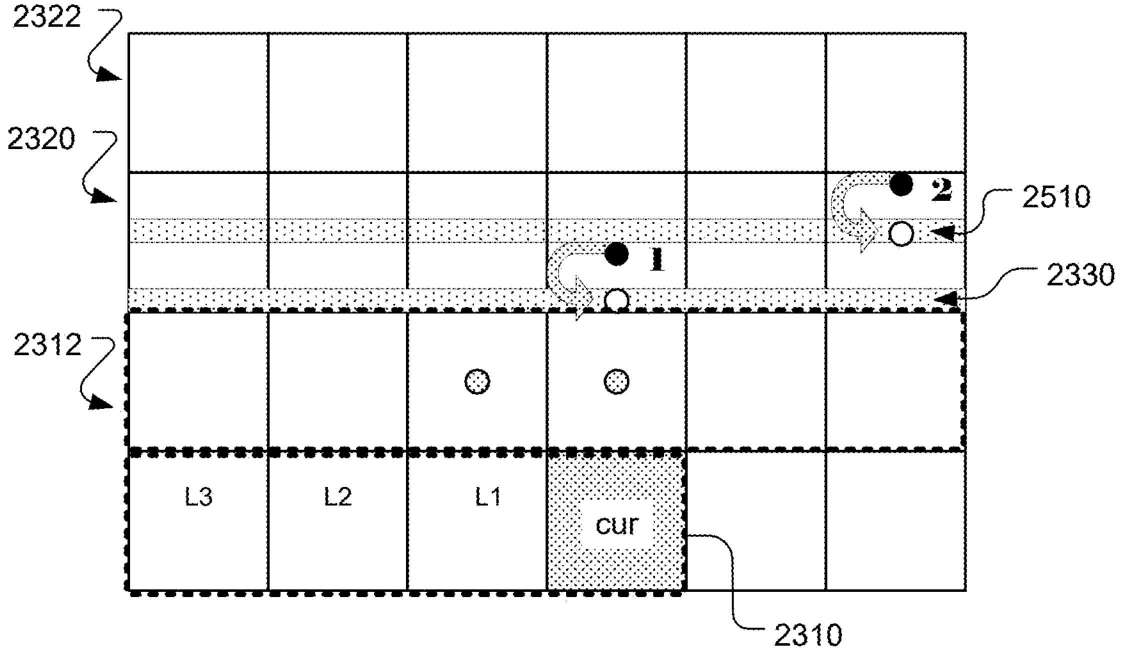
FIG. 25 illustrates an example to map motion information for the to-be referenced positions in a non-available region to pre-defined positions, where the pre-defined positions are located at the bottom line or the centre line of respective CTU rows.

In another embodiment, the CCM information in the current CTU row, or the current CTU row+M CTU rows can be referenced without limits, and for the to-be referenced positions in above CTU row, the positions will be mapped to the last line or bottom line or centre line of the corresponding CTU row for referencing depending on the position of the to-be referenced CCM information. For example, as shown in FIG. 25, the CCM information in the current CTU row (2310) and the above-first CTU row (2312) can be referenced without limits, and for the to-be referenced position 1 in above-second CTU row (2320), the positions will be mapped to the bottom line (2330) of the above-second CTU row before referring. However, for the to-be referenced position 2 in above-second CTU row, the positions will be mapped to the centre line (2510) of the above-second CTU row (2320) before referring since it is closer to the centre line (2510) compared with bottom line (2330). The legend for the candidate types (i.e., 2340, 2342 and 2344) of FIG. 25 is the same as that in FIG. 23.

Figure 26:
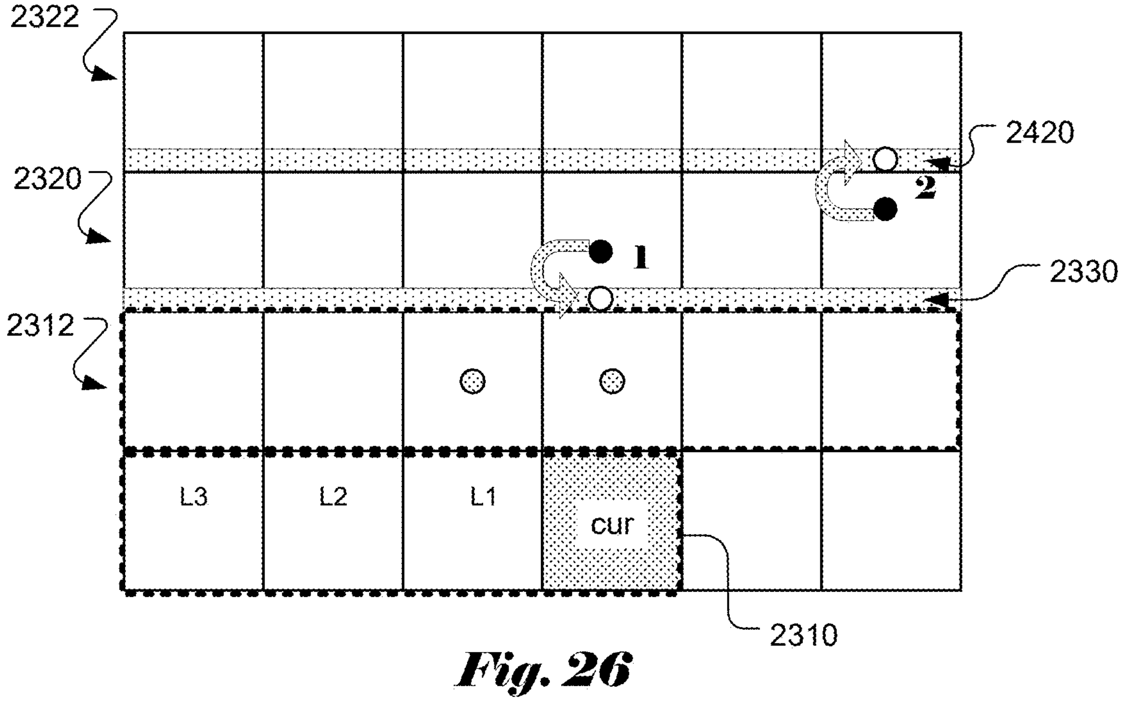
FIG. 26 illustrates an example to map motion information for the to-be referenced positions in a non-available region to pre-defined positions, where the pre-defined positions are located at the bottom line of respective CTU rows or one CTU row above the respective CTU rows.

In another embodiment, the CCM information in the current CTU row, or the current CTU row+M CTU rows can be referenced without limits, and for the to-be referenced positions in the above CTU row, the positions will be mapped to the last line or bottom line of the corresponding CTU row for referencing depending on the position of the to-be referenced CCM information. For example, as shown in FIG. 26, the CCM information in the current CTU row (2310) and the above-first CTU row (2312) can be referenced without limits, and for the to-be referenced position 1 in the above-second CTU row (2320), the positions will be mapped to the bottom line (2330) of the above-second CTU row (2320) before referring. However, for the to-be referenced position 2 in the above-second CTU row (2320), the positions will be mapped to the bottom line (2420) of the above-third CTU row (2322) before referring since it is closer to the bottom line (2420) of the above-third CTU row compared with bottom line (2330) of the above-second CTU row as shown in FIG. 26. The legend for the candidate types (i.e., 2340, 2342 and 2344) is the same as that in FIG. 23.

In another embodiment, the CCM information in the current CTU, or the current CTU+N left CTU can be referenced without limits, and for the left CTUs, the to-be referenced positions will be mapped to the very right line closest to the current CTU, or the current CTU+N left CTU. For example, the CCM information in the current CTU and first left CTU can be referenced without limits, and if the to-be referenced positions are in the second left CTU, the positions will be mapped to one line left to the first left CTU. If the to-be referenced positions are in the third left CTU, the positions will be mapped to one line left to first left CTU.

For example, the CCM information in the current CTU and the first left CTU can be referenced without limits, and if the to-be referenced positions are in the second left CTU, the positions will be mapped to the very right line of the second left CTU. If the to-be referenced positions are in the third left CTU, the positions will be mapped to the very right line to the third left CTU.

In another embodiment, when the available range for including non-adjacent candidates is constrained, if the position of a non-adjacent candidate is outside of the available range, that candidate is skipped and will not be inserted into the candidate list. The available region can be the current CTU, current CTU row, current CTU row+above N CTU rows, current CTU+left M CTUs, or current CTU+above N CTU rows+left M CTUs.

Models Generated Based on Other Inherited Models

In another embodiment, a single cross-component model can be generated from a multiple cross-component model. For example, if a candidate is coded with multiple cross-component models (e.g., MMLM, or CCCM with multi-model), a single cross-component model can be generated by selecting the first or the second cross-component model in the multi cross-component models.

Candidate List Construction

In one embodiment, the candidate list is constructed by adding candidates in a pre-defined order until the maximum candidate number is reached. The candidates added may include all or some of the aforementioned candidates, but not limited to the aforementioned candidates. For example, the candidate list may include spatial neighbouring candidates, temporal neighbouring candidate, historical candidates, non-adjacent neighbouring candidates, single model candidates generated based on other inherited models or combined model (as mentioned later in section entitled: Inheriting Multiple Cross-Component Models). For another example, the candidate list can include the same candidates as previous example, but the candidates are added into the list in a different order.

In another embodiment, if all the pre-defined neighbouring and historical candidates are added but the maximum candidate number is not reached, some default candidates are added into the candidate list until the maximum candidate number is reached.

In one sub-embodiment, the default candidates include but not limited to the candidates described below. The final scaling parameter α is from the set $$\left\{0, \frac{1}{8}, -\frac{1}{8}, +\frac{2}{8}, -\frac{2}{8}, +\frac{3}{8}, -\frac{3}{8}, +\frac{4}{8}, -\frac{4}{8}\right\},$$

and the offset parameter β=1/(1<<bit_depth) is derived based on neighbouring luma and chroma samples. For example, if the average value of neighbouring luma and chroma samples are lumaAvg and chromaAvg, then β is derived by β=chromaAvg−α·lumaAvg. The average value of neighbouring luma samples (lumaAvg) can be calculated by all selected luma samples, the luma DC mode value the current luma CB, or the average of the maximum and minimum luma samples $$\left(\text{e.g., } lumaAvg = \left(\text{Max}\left(x_A^0, x_A^1\right) + \text{Min}\left(x_B^0, x_B^1\right) + 1\right) \gg 1,\right.$$

or $$\left. lumaAvg = \left(\text{Min}\left(x_A^0, x_A^1\right) + \text{Max}\left(x_B^0, x_B^1\right) + 1\right) \gg 1\right).$$

Similarly, average value of neighbouring chroma samples (chromaAvg) can be calculated by all selected chroma samples, the chroma DC mode value the current chroma CB, or the average of the maximum and minimum chroma samples $$\left(\text{e.g., } chromaAvg = \left(\text{Max}\left(y_A^0, y_A^1\right) + \text{Min}\left(y_B^0, y_B^1\right) + 1\right) \gg 1,\right.$$

$$\left.\text{or } chormaAvg = \left(\text{Min}\left(y_A^0, y_A^1\right) + \text{Max}\left(y_B^0, y_B^1\right) + 1\right) \gg 1\right).$$

In another sub-embodiment, the default candidates include but not limited to the candidates described below. The default candidates are α·G+β, where G is the luma sample gradients instead of down-sampled luma samples L. The 16 GLM filters described in the section, entitled: Gradient Linear Model (GLM), are applied. The final scaling parameter α is from the set $$\left\{0, \frac{1}{8}, -\frac{1}{8}, +\frac{2}{8}, -\frac{2}{8}, +\frac{3}{8}, -\frac{3}{8}, +\frac{4}{8}, -\frac{4}{8}\right\}.$$

The offset parameter β=1/(1<<bit_depth) or is derived based on neighbouring luma and chroma samples.

In another embodiment, a default candidate can be an earlier candidate with a delta scaling parameter refinement. For example, if the scaling parameter of an earlier candidate is α, the scaling parameter of a default candidate is (α+Δα), where Δα can be from the set $$\left\{\frac{1}{8}, -\frac{1}{8}, +\frac{2}{8}, -\frac{2}{8}, +\frac{3}{8}, -\frac{3}{8}, +\frac{4}{8}, -\frac{4}{8}\right\}.$$

The offset parameter of a default candidate will be derived by (α+Δα) and the average value of neighbouring luma and chroma samples of the current block.

In another embodiment, a default candidate can be a shortcut to indicate a cross-component mode (i.e., using the current neighbouring luma/chroma reconstructed samples to derive cross-component models) rather than inheriting parameters from neighbours. For example, a default candidate can be CCLM_LA, CCLM_L, CCLM_A, MMLM_LA, MMLM_L, MMLM_A, single-model CCCM, multiple-model CCCM or cross-component model with a specified GLM pattern.

In another embodiment, a default candidate can be a cross-component mode (i.e., using the current neighbouring luma/chroma reconstructed samples to derive cross-component models) rather than inheriting parameters from neighbours, and also with a scaling parameter update (Δα). Then, the scaling parameter of a default candidate is (α+Δα). For example, a default candidate can be CCLM_LA, CCLM_L, CCLM_A, MMLM_LA, MMLM_L, or MMLM_A. For another example, Δα can be from the set $$\left\{\frac{1}{8}, -\frac{1}{8}, +\frac{2}{8}, -\frac{2}{8}, +\frac{3}{8}, -\frac{3}{8}, +\frac{4}{8}, -\frac{4}{8}\right\}.$$

The offset parameter of a default candidate will be derived by (α+Δα) and the average value of neighbouring luma and chroma samples of the current block. For still another example, the Δα can be different for each colour components.

In another embodiment, a default candidate can be an earlier candidate with partial selected model parameters. For example, suppose an earlier candidate has m parameters, it can choose k out of m parameters from an earlier candidate to be a default candidate, where 0<k<m and m>1.

In another embodiment, a default candidate can be the first model of an earlier MMLM candidate (i.e., the model used when the sample value being less than or equal to a classification threshold). In still another embodiment, a default candidate can be the second model of an earlier MMLM candidate (i.e., the model used when the sample value being greater than or equal to a classification threshold). In still another embodiment, a default candidate can be the combination of two models of an earlier MMLM candidate. For example, if the models of an earlier MMLM candidate are $$\{c_0^0, c_1^0, \ldots, c_{M-1}^0\}$$

and $$\{c_0^1, c_1^1, \ldots, c_{M-1}^1\}.$$

The model parameters of an default candidate can be $$\{(1-\alpha)\times c_0^0+\alpha\times c_0^1, (1-\alpha)\times c_1^0+\alpha\times c_1^1, \ldots, (1-\alpha)\times c_{M-1}^0+\alpha\times c_{M-1}^1\},$$

where α is a weighting factor which can be predefined or implicitly derived based on neighbouring template cost, and $$c_x^y$$

is the x-th parameter of the y-th model.

When constructing a candidate list, candidates are inserted into the list according to a pre-defined order. For example, the pre-defined order can be spatial adjacent candidates, temporal candidates, spatial non-adjacent candidates, historical candidates, and then default candidates. In one embodiment, if cross-component models are derived for non-LM coded blocks (e.g., as mentioned in the section entitled: Inherit Neighbouring Model Parameters for Refining the Cross-Component Model Parameters), the candidate models of non-LM coded blocks are included into the list after including candidate models of LM coded blocks. In another embodiment, if cross-component models are derived for non-LM coded blocks, the candidate models of non-LM coded blocks are included into the list before including default candidates. In still another embodiment, if cross-component models are derived for non-LM coded blocks, the candidate models of non-LM coded blocks have lower priority to be included into the list than candidate models from LM coded blocks.

When constructing a candidate list, only the candidates with a certain prediction mode can be added into the list. For example, it can limit only the candidates derived by CCLM or MMLM modes being allowed to be added into the list. For another example, it can limit only the candidates derived by single-model modes (e.g., CCLM, or CCLM with single-model) being allowed to be added into the list. For another example, it can limit only the candidates derived by multi-model modes (e.g., MMLM, or CCCM with multi-model) being allowed to be added into the list. For another example, it can limit only the candidates derived by GLM modes being allowed to be added into the list. For another example, it can limit only the candidates derived by a specific mode (e.g., CCLM, MMLM, CCCM, CCCM with multi-model, or GLM) being allowed to be added into the list. In one embodiment, if only the candidate with a certain prediction mode can be added into the list, when doing prediction mode signalling, it can signal the prediction mode first and then signal if the proposed cross-component merge mode is used or not. If the proposed cross-component merge mode is used, then signal the candidate index.

Removing or Modifying Similar Neighbouring Model Parameters

When inheriting cross-component model parameters from other blocks, it can further check the similarity between the inherited model and the existing models in the candidate list or those model candidates derived by the neighbouring reconstructed samples of the current block (e.g., models derived by CCLM, MMLM, or CCCM using the neighbouring reconstructed samples of the current block). If the model of a candidate parameter is similar to the existing models, the model will not be included in the candidate list. In one embodiment, it can compare the similarity of (α×lumaAvg+β) or a among existing candidates to decide whether to include the model of a candidate or not. For example, if the (α×lumaAvg+β) or α of the candidate is the same as one of the existing candidates, the model of the candidate is not included. For another example, if the difference of (α×lumaAvg+β) or a between the candidate and one of existing candidates is less than a threshold, the model of the candidate is not included. Besides, the threshold can be adaptive based on coding information (e.g., the current block size or area). For another example, when comparing the similarity, if a model from a candidate and the existing model both use CCCM, it can compare similarity by checking the value of ($c_0C+c_1N+c_2S+c_3E+c_4W+c_5P+C_6B$) to decide whether to include the model of a candidate or not. In another embodiment, if a candidate position point to a CU which is the same one of the existing candidates, the model of the candidate parameter is not included. In still another embodiment, if the model of a candidate is similar to one of existing candidate models, it can adjust the inherited model parameters so that the inherited model is different from the existing candidate models. For example, if the inherited scaling parameter is similar to one of existing candidate models, the inherited scaling parameter can add a predefined offset (e.g., 1>>S or −(1>>S), where S is the shift parameter) so that the inherited parameter is different from the existing candidate models.

Inheriting Candidates from the Candidates in the Candidate List of Neighbours

Figure 27:
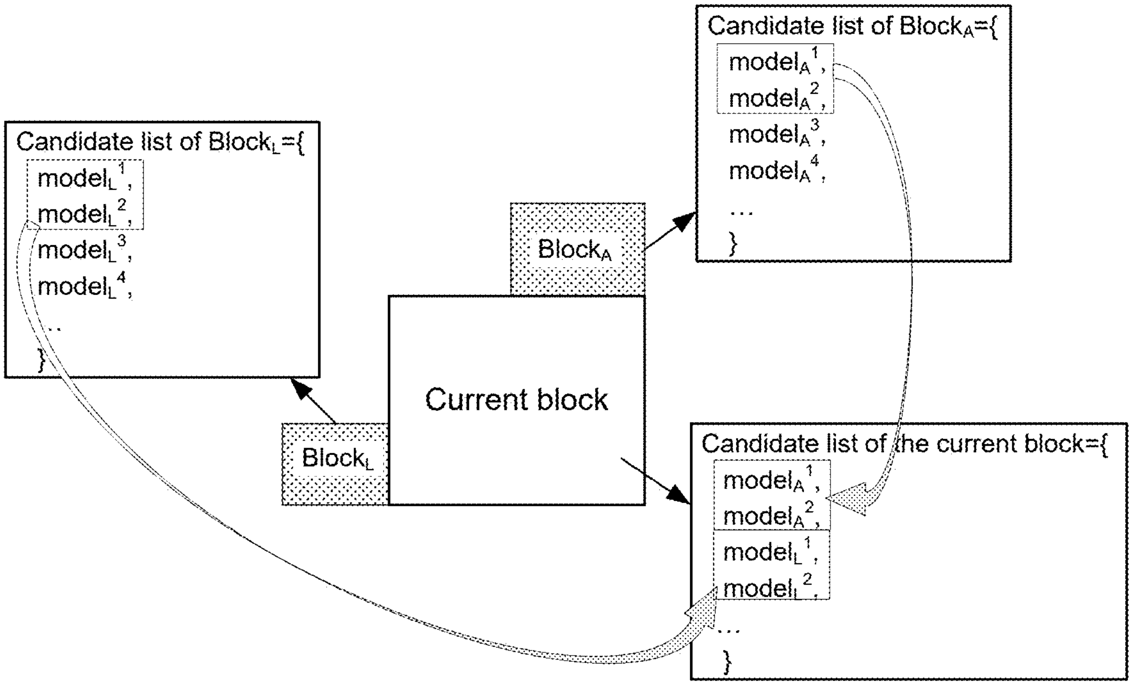
FIG. 27 illustrates an example of inheriting candidates from the candidates in the candidate list of neighbour blocks.

The candidates in the current inherited candidate list can be from neighbouring blocks. For example, it can inherit the first k candidates in the inherited candidate list of the neighbouring blocks. As shown in the FIG. 27 the current block can inherit the first two candidates in the inherited candidate list of the above neighbouring block and the first two candidates in the inherited candidate list of the left neighbouring block. For an embodiment, after adding the neighbouring spatial candidates and non-adjacent spatial candidates, if the current inherited candidate list is not full, the candidates in the candidate list of neighbouring blocks are included into the current inherited candidate list. For another embodiment, when including the candidates in the candidate list of neighbouring blocks, the candidates in the candidate list of left neighbouring blocks are included before the candidates in the candidate list of above neighbouring blocks. For still another embodiment, when including the candidates in the candidate list of neighbouring blocks, the candidates in the candidate list of above neighbouring blocks are included before the candidates in the candidate list of left neighbouring blocks.

Reorder the Candidates in the List

The candidates in the list can be reordered to reduce the syntax overhead when signalling the selected candidate index. The reordering rules can depend on the coding information of neighbouring blocks or the model error. For example, if neighbouring above or left blocks are coded by MMLM, the MMLM candidates in the list can be moved to the head of the current list. Similarly, if neighbouring above or left blocks are coded by single model LM or CCCM, the single model LM or CCCM candidates in the list can be moved to the head of the current list. Similarly, if GLM is used by neighbouring above or left blocks, the GLM related candidates in the list can be moved to the head of the current list.

Figure 28:
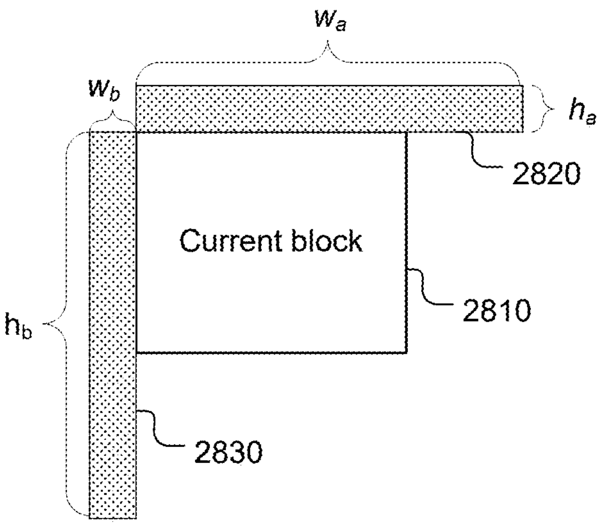
FIG. 28 illustrates an example of neighbouring templates for calculating model error.

In still another embodiment, the reordering rule is based on the model error by applying the candidate model to the neighbouring templates of the current block, and then compare the error with the reconstructed samples of the neighbouring template. For example, as shown in FIG. 28, the size of above neighbouring template 2820 of the current block is $w_a \times h_a$, and the size of left neighbouring template 2830 of the current block 2810 is $W_b \times h_b$. Suppose K models are in the current candidate list, and $\alpha_k$ and $\beta_k$ are the final scale and offset parameters after inheriting the candidate k. The model error of candidate k corresponding to the above neighbouring template is:

$$e_a^k = \sum_{i,j} \left| \left( \alpha_k \times recL_a'^{(i,j)} + \beta_k \right) - recC_a^{(i,j)} \right|$$

where $$recL_a'^{(i,j)}$$

and $$recC_a^{(i,j)}$$

are the reconstructed samples of luma (e.g., after downsampling process or after applying GLM pattern) and reconstructed samples of chroma at position (i, j) in the above template, and $0 \le i < w_a$ and $0 \le j < h_a$.

Similarly, the model error of candidate k by the left neighbouring template is:

$$e_b^k = \sum_{m,n} \left| \left( \alpha_k \times recL_b'^{(m,n)} + \beta_k \right) - recC_b^{(m,n)} \right|$$

where $$recL_b'^{(m,n)}$$

and $$recC_b^{(m,n)}$$

are the reconstructed samples of luma (e.g., after applying downsampling process or GLM pattern) and reconstructed samples of chroma at position (m, n) in the left template, and $0 \le m < w_b$ and $0 \le n < h_b$.

Then the model error of candidate k is:

$$e^k = e_a^k + e_b^k$$

After calculating the model error among all candidates, it can get a model error list $E = \{e^0, e^1, e^2, \ldots, e^k, \ldots, e^{K-1}\}$. Then, it can reorder the candidate index in the inherited candidate list by sorting the model error list in ascending order.

In still another embodiment, if the candidate k uses CCCM prediction, the $$e_a^k$$

and $$e_b^k$$

are defined as:

$$e_a^k = \sum_{i,j} \left| \left( c0_k \times recL_a'^{(i,j)} + c1_k \times recL_a'^{(i,j-1)} + c2_k \times recL_a'^{(i,j+1)} + c3_k \times recL_a'^{(i-1,j)} + \times recL_a'^{(i+1,j)} + c5_k \times P + c6_k \times B \right) - recC_a^{(i,j)} \right|$$

$$e_b^k = \sum_{i,j} \left| \left( c0_k \times recL_b'^{(i,j)} + c1_k \times recL_b'^{(i,j-1)} + c2_k \times recL_b'^{(i,j+1)} + c3_k \times recL_b'^{(i-1,j)} + \times recL_b'^{(i+1,j)} + c5_k \times P + c6_k \times B \right) - recC_b^{(i,j)} \right|$$

where $c0_k$, $c1_k$, $c2_k$, $c3_k$, $c4_k$, $c5_k$, and $c6_k$ are the final filtering coefficients after inheriting the candidate k. P and B are the nonlinear term and bias term.

In still another embodiment, if the above neighbouring template is not available, then $$e^k = e_b^k.$$

Similarly, if the left neighbouring template is not available, then $$e^k = e_a^k.$$

If both templates are not available, the candidate index reordering method using model error is not applied.

In still another embodiment, not all positions inside the above and left neighbouring template are used in calculating model error. It can choose partial positions inside the above and left neighbouring template to calculate model error. For example, it can define a first start position and a first subsampling interval depends on the width of the current block to partially select positions inside the above neighbouring template. Similarly, it can define a second start position and a second subsampling interval depends on the height of the current block to partially select positions inside the left neighbouring template. For another example, $h_a$ or $w_b$ can be a constant value (e.g., $h_a$ or $w_b$ can be 1, 2, 3, 4, 5, or 6). For another example, $h_a$ or $w_b$ can be dependent on the block size. If the current block size is greater than or equal to a threshold, $h_a$ or $w_b$ is equal to a first value. Otherwise, $h_a$ or $w_b$ is equal to a second value.

In still another embodiment, the candidates of different types are reordered separately before the candidates are added into the final candidate list. For each type of the candidates, the candidates are added into a primary candidate list with a pre-defined size $N_1$. The candidates in the primary list are reordered. The candidates ($N_2$) with the smallest costs are then added into the final candidate list, where $N_2 \leq N_1$. In another embodiment, the candidates are categorized into different types based on the source of the candidates, including but not limited to the spatial neighbouring models, temporal neighbouring models, non-adjacent spatial neighbouring models, and the historical candidates. In another embodiment, the candidates are categorized into different types based on the cross-component model mode. For example, the types can be CCLM, MMLM, CCCM, and CCCM multi-model. For another example, the types can be GLM-non active or GLM active.

In still another embodiment, after the candidates are reordered based on the template cost, the redundancy of the candidate can be further checked. A candidate is considered to be redundant if the template cost difference between it and its predecessor in the list is smaller than a threshold. If a candidate is considered redundant, it can be removed from the list, or it can be move to the end of the list.

Signalling the Inherit Candidate Index in the List

An on/off flag can be signalled to indicate if the current block inherits the cross-component model parameters from neighbouring blocks or not. The flag can be signalled per CU/CB, per PU, per TU/TB, or per colour component, or per chroma colour component. A high level syntax can be signalled in SPS, PPS (Picture Parameter Set), PH (Picture header) or SH (Slice Header) to indicate if the proposed method is allowed for the current sequence, picture, or slice.

If the current block inherits the cross-component model parameters from neighbouring blocks, the inherited candidate index is signalled. The index can be signalled (e.g., signalled using truncate unary code, Exp-Golomb code, or fix length code) and shared between the current Cb and Cr blocks. For another example, the index can be signalled per colour component. For example, one inherited index is signalled for Cb component, and another inherited index is signalled for Cr component. For another example, it can use chroma intra prediction syntax (e.g., IntraPredModeC[xCb][yCb]) to store the inherited index.

If the current block inherits the cross-component model parameters from neighbouring blocks, the current chroma intra prediction mode (e.g., IntraPredModeC[xCb][yCb] as defined in VVC standard) is temporally set to a cross-component mode (e.g., CCLM_LA) at the bitstream syntax parsing stage. Later, at the prediction stage or reconstruction stage, the candidate list is derived, and the inherited candidate model is then determined by the inherited candidate index. After obtaining the inherited model, the coding information of the current block is then updated according to the inherited candidate model. The coding information of the current block includes but not limited to the prediction mode (e.g., CCLM_LA or MMLM_LA), related sub-mode flags (e.g., CCCM mode flag), prediction pattern (e.g., GLM pattern index), and the current model parameters. Then, the prediction of the current block is generated according to the updated coding information.

Inheriting Multiple Cross-Component Models

The final prediction of the current block can be the combination of multiple cross-component models, or fusion of the selected cross-component models with the prediction by non-cross-component coding tools (e.g., intra angular prediction modes, intra planar/DC modes, or inter prediction modes). In one embodiment, if the current candidate list size is N, it can select k candidates from the total N candidates (where k≤N). Then, k predictions are respectively generated by applying the cross-component model of the selected k candidates using the corresponding luma reconstructed samples. The final prediction of the current block is the combination results of these k predictions. For example, if two candidate predictions (denoted as $p_{cand1}$ and $p_{cand2}$) are combined, the final prediction at (x, y) position of the current block is $p_{final}(x, y)=(1-\alpha)\times p_{cand1}(x,y)+\alpha\times p_{cand2}(x,y)$, where a is a weighting factor. Besides, the weighting factor α can be predefined or implicitly derived by neighbouring template cost. For example, by using the template cost defined in the section entitled: Inherit Non-Adjacent Spatial Neighbouring Models, the corresponding template cost of two candidates are $e^{cand1}$ and $e^{cand2}$, then α is $e^{cand1}/(e^{cand1}+e^{cand2})$. In another embodiment, if two candidate models are combined, the selected models are from the first two candidates in the list. In still another embodiment, if I candidate models are combined, the selected models are from the first i candidates in the list.

In another embodiment, if the current candidate list size is N, it can select k candidates from the total N candidates (where k≤N). The k cross-component models can be combined into one final cross-component model by weighted-averaging the corresponding model parameters. For example, if a cross-component model has M parameters, the j-th parameter of the final cross-component model is the weighted-averaging of the j-th parameter of the k selected candidate, where j is 1 . . . . M. Then, the final prediction is generated by applying the final cross-component model to the corresponding luma reconstructed samples. For example, if two candidate models are $$\{c_0^0, c_1^0, \ldots, c_{M-1}^0\}$$

and $$\{c_0^1, c_1^1, \ldots, c_{M-1}^1\}.$$

The final cross-component model is $$\{(1-\alpha)\times c_0^0+\alpha\times c_0^1, (1-\alpha)\times c_1^0+\alpha\times c_1^1, \ldots, (1-\alpha)\times c_{M-1}^0+\alpha\times c_{M-1}^1\},$$

where α is a weighting factor which can be predefined or implicitly derived by neighbouring template cost, and $$c_x^y$$

is the x-th model parameter of the y-th candidate. For example, by using the template cost defined in the section entitled: Inherit Non-Adjacent Spatial Neighbouring Models, the corresponding template cost of two candidates are $e^{cand1}$ and $e^{cand2}$, then α is $e^{cand1}/(e^{cand1}+e^{cand2})$. For still an example, the two candidate models are one from the spatial adjacent neighbouring candidate, and another one from the non-adjacent spatial candidate or history candidate. If the spatial adjacent neighbouring candidate is not available, then the two candidate models are all from the non-adjacent spatial candidates or history candidates. In another embodiment, if two candidate models are combined, the selected models are from the first two candidates in the list. In still another embodiment, if i candidate model is combined, the selected models are from the first i candidate in the list.

In another embodiment, two cross-component models are combined into one final model by weighted-averaging the corresponding model parameters, where the two cross-component models are one from the above spatial neighbouring candidate and another one from the left spatial neighbouring candidate. The above spatial neighbouring candidate is the neighbouring candidate that has the vertical position less than or equal to the top block boundary position of the current block. The left spatial neighbouring candidate is the neighbouring candidate that has the horizontal position less than or equal to the left block boundary position of the current block. The weighting factor α is determined according to the horizontal and vertical spatial positions inside the current block. For example, if two candidate predictions (denoted as $p_{above}$ and $p_{left}$) are combined, the final prediction at (x, y) position of the current block is $p_{final}(x, y)=(1-\alpha)\times P_{above}(x,y)++\times p_{left}(x,y)$, where $\alpha=y/(x+y)$. In another embodiment, the above spatial neighbouring candidate is the first candidate in the list that has the vertical position less than or equal to the top block boundary position of the current block. The left spatial neighbouring candidate is the first candidate in the list that has the horizontal position less than or equal to the left block boundary position of the current block.

In another embodiment, it can combine cross-component model candidates with the prediction by non-cross-component coding tools. For example, one cross-component model candidate is selected from a list, and its prediction is denoted as $p_{ccm}$. Another prediction can be from chroma DM, chroma DIMD, or intra angular mode, and denoted as $p_{non\text{-}ccm}$. The final prediction at (x, y) position of the current block is $p_{final}(x, y)=(1-\alpha)\times p_{ccm}(x,y)+\alpha\times p_{non\text{-}ccm}(x,y)$, where a is the weighting factor, which can be predefined or implicitly derived by neighbouring template cost. For still the same example, the prediction by a non-cross-component coding tool can be predefined or signalled. The prediction by non-cross-component coding tool is chroma DM or chroma DIMD. For another example, prediction by non-cross-component coding tool is signalled, but the index of cross-component model candidate is predefined or determined by the coding modes of neighbouring blocks. For still the same example, if at least one of neighbouring spatial blocks is coded with CCCM mode, the first candidate has CCCM model parameters is selected. If at least one of neighbouring spatial blocks is coded with GLM mode, the first candidate has GLM pattern parameters is selected. Similarly, if at least one of neighbouring spatial blocks is coded with MMLM mode, the first candidate has MMLM parameters is selected.

In another embodiment, it can combine cross-component model candidates with the prediction by the current cross-component model. For example, one cross-component model candidate is selected from the list, and its prediction is denoted as $p_{ccm}$. Another prediction can be from the cross-component prediction mode by the current neighbouring reconstructed samples and denoted as $p_{curr\text{-}ccm}$. The final prediction at (x, y) position of the current block is $p_{final}(x, y)=(1-\alpha)\times p_{ccm}(x,y)+\alpha\times p_{curr\text{-}ccm}(x,y)$, where α is the weighting factor which can be predefined or implicitly derived according to neighbouring template cost. For still the same example, the prediction by the current cross-component model can be predefined or signalled. The prediction by the non-cross-component coding tool is CCCM_LT, LM_LT (i.e., single model LM using both top and left neighbouring samples to derive the model), or MMLM_LT (i.e., multi-model LM using both top and left neighbouring samples to derive the model). In one embodiment, the selected cross-component model candidate is the first candidate in the list.

In another embodiment, it can combine multiple cross-component models into one final cross-component model. For example, it can choose one model from a candidate, and choose a second model from another candidate to be a multi-model mode. The selected candidate can be CCLM/MMLM/GLM/CCCM coded candidate. The multi-model classification threshold can be the average of the offset parameters (e.g., offset/β in CCLM, or $c_6\times B$ or $c_6$ in CCCM) of the two selected modes. In one embodiment, if two candidate models are combined, the selected models are the first two candidates in the list. In another embodiment, the classification threshold is set to the average value of the neighbouring luma and chroma samples of the current block.

Refining the Inherited Candidate Positions

In one embodiment, the final inherited model of the current block is from the cross-component model at the indicated candidate position with a delta position. For example, if the current selected candidate position is $$(x^i_{nei}, y^i_{nei}),$$

it can further signal a delta position, $$(dx^i_{nei}, dy^i_{nei}),$$

to indicate the position of the final inherited model. That is, the final inherited model of the current block is from the cross-component model at $$(x^i_{nei}+dx^i_{nei}, y^i_{nei}+dy^i_{nei}).$$

In one embodiment, the signal delta position can only have a horizontal delta position or a vertical delta position, that is, $$(dx^i_{nei}, 0)$$

or $$(0, dy^i_{nei}).$$

Besides, the signalled delta position can be shared among multiple colour components or signalled per colour component. For example, the signalled delta position is share for the current Cb and Cr blocks, or the signalled delta position is only used for the current Cb block or the current Cr block. Furthermore, the signalled $$dx_{nei}^{i}$$

or $$dy_{nei}^{i}$$

may have a sign it to indicate positive delta position or negative delta position. When indicating the magnitude of $$dx_{nei}^{i}$$

or $$dy_{nei}^{i},$$

it can be signalled by a look-up table index. For example, a look-up table is {1, 2, 4, 8, 16, . . . }, if $$|dx_{nei}^{i}|$$

is equal to 8, then the table index 3 is signalled (the first table index is 0).

In one embodiment, when a candidate is selected from the candidate list, the models from the neighbouring positions of the selected candidate are further searched. The final inherited model can be from the neighbouring position of the selected candidate. Positions of a pre-defined search pattern inside an area around the selected candidate is searched. In one embodiment, the neighbouring positions searched are either horizontally different or vertically different from the selected candidate, that is, the delta position is either $$(dx_{nei}^{i}, 0)$$

or $$(0, dy_{nei}^{i}).$$

In another embodiment, the neighbouring positions searched are diagonally different from the selected candidate, that is, the delta position is $$(dx_{nei}^{i}, dy_{nei}^{i}),$$

where $$dx_{nei}^{i} = \pm dy_{nei}^{i}.$$

Note, the delta position can be a positive or negative number.

In another embodiment, the models from the neighbouring positions of the candidate are further searched only when the selected candidate is a non-adjacent candidate. Positions of a pre-defined search pattern inside an area around the selected candidate are searched. For example, suppose the distances between the non-adjacent candidates are the current coding block width and height. After a non-adjacent candidate is selected, the positions whose horizontal distance and vertical distance are both smaller than current coding block width and height respectively are further searched, i.e., $$dx_{nei}^{i}$$

is within the range of ±width and $$dy_{nei}^{i}$$

is within the range of ±height. In one embodiment, the neighbouring positions searched are either horizontally different or vertically different from the selected candidate, that is, the delta position is either $$(dx_{nei}^{i}, 0)$$

or $$(0, dy_{nei}^{i}).$$

In another embodiment, the neighbouring positions searched are diagonally different from the selected candidate, that is, the delta position is $$(dx_{nei}^{i}, dy_{nei}^{i}),$$

where $$dx_{nei}^{i} = \pm dy_{nei}^{i}.$$

Inheriting from Shared Cross-Component Models

In one embodiment, the current picture is segmented into multiple non-overlapped regions, and each region size is M×N. A shared cross-component model is derived for each region, respectively. The neighbouring available luma/chroma reconstructed samples of the current region are used to derive the shared cross-component model of the current region. Then, for a block inside the current region, it can determine whether to inherit the shared cross-component model or derive cross-component model by the neighbouring available luma/chroma reconstructed samples of the block. In one embodiment, the M×N can be a predefined value (e.g. 32×32 regarding to the chroma format), a signalled value (e.g. signalled in sequence/picture/slice/tile-level), a derived value (e.g. depending on the CTU size), or the maximum allowed transform block size.

In another embodiment, each region may have more than one shared cross-component model. For example, it can use various neighbouring templates (e.g., top and left neighbouring samples, top-only neighbouring samples, left-only neighbouring samples) to derive more than one shared cross-component model. Besides, the shared cross-component models of the current region can be inherited from previously used cross-component models. For example, the shared model can be inherited from the models of adjacent spatial neighbours, non-adjacent spatial neighbours, temporal neighbours, or from a historical list.

When doing signalling, a first flag can be used to determine if the current cross-component model is inherited from the shared cross-component models or not. If the current cross-component model is inherited from the shared cross-component models, the second syntax indicate the inherited index of the shared cross-component models (e.g., signalled using truncate unary code, Exp-Golomb code, or fixed length code).

Sharing the Buffer Resource with Existing Coding Tools

To store the CCM information (e.g., prediction mode, related sub-mode flags, prediction pattern, or model parameters) for further model inheritance, the buffer for storing inter coding information (e.g., motion vector buffer) is shared with cross-component merge mode for storing CCM information. The buffer size can be reduced by sharing the buffer among different coding tools. Otherwise, buffer space has to be allocated to store CCM information and inter coding information separately. The key idea behind the shared buffer is that a block is coded using only one selected coding mode among multiple candidates. Therefore, the coding information for various coding modes can share a common buffer. Suppose the minimal allowed block size is m×n, the current CTU size is p×q, and the current picture size is r×s. A CTU-level buffer and picture-level buffers are used for storing the inter coding and CCM information of the current CTU and each picture, respectively. A CTU-level buffer is created for storing the final inter coding or CCM information, and this CTU-level buffer size is [p/m]×[q/n]. Since [p/m] corresponds to the number of blocks in the horizontal direction and [q/n] corresponds to the number of blocks in the vertical direction, [p/m]> [q/n] corresponds to the total number of blocks in the CTU. A picture-level buffer is created for storing the final inter coding or CCM information of the current picture, and this picture-level buffer size is [r/i]>[s/j], where i>m and j>n. In other words, the coding information is stored in the picture buffer in the unit of i×j. Since [r/i] corresponds to the number of second blocks in the horizontal direction and [s/j] corresponds to the number of second blocks in the vertical direction, [r/i]>[s/j] corresponds to the total number of second blocks in the picture. After encoding or decoding the current block, the inter coding or CCM information of the current block is firstly saved to the corresponding positions of CTU-level buffer in unit of m×n, where the corresponding positions are the positions covered by the current block in unit of m×n. Later, after encoding or decoding the current CTU, the inter coding or CCM information in the current CTU-level buffer is saved to the corresponding positions of the picture-level buffer in unit of i×j.

Figure 29:
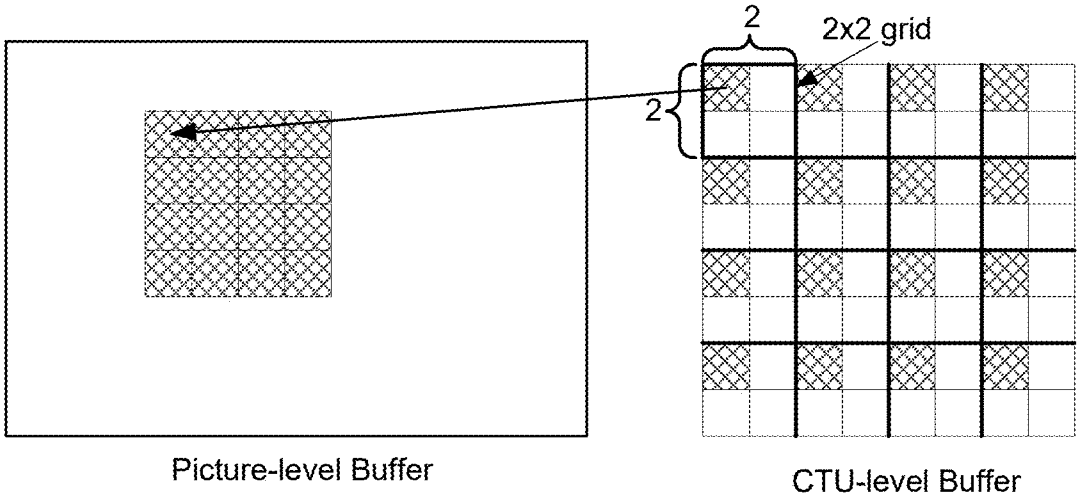
FIG. 29 illustrates an example of subsampling the inter coding or CCM information at the left-above position of each 2×2 grids in the CTU-level buffer before the information is saved to the picture-level buffer.

However, if the unit of CTU-level buffer and picture-level buffer are not the same (e.g., i>m or j>n), it should subsample the inter coding or CCM information in CTU-level buffer for saving to the picture-level buffer. Suppose i/m=g and j/n=h, one of each g×h grids of CTU-level buffer is selected to save the inter coding or CCM information to the corresponding position of the picture-level buffer. For example, as shown in FIG. 29, if g=2 and h=2, one selected position of each 2×2 grid is selected to save the inter coding or CCM information to the corresponding position of the picture-level buffer. In one embodiment, the selected position can be the left-above, left-bottom, right-above, or right-bottom of each 2×2 grid. As shown in FIG. 29, the inter coding or CCM information at the left-above position marked in slash of each 2×2 grid is saved to the picture-level buffer. In another embodiment, when subsampling the CCM information in CTU-level buffer for saving to the picture-level buffer, it can conditionally check the prediction modes inside the g×h grids. For example, if more than a percentage of positions inside the g×h grids are intra mode (e.g., more than 50% or 75%), the selected and saved data is CCM information. Otherwise (i.e., most of positions inside the g×h grids are inter mode), the selected and saved data is inter coding information. When selecting the candidate for saving to picture-level buffer, it can follow a predefined scanning order to select the first allowed candidate. For example, if the selected and saved data is CCM information, it can select the first grid inside the g×h grids that has CCM information by a predefined scanning order. For another example, if the selected and saved data is inter coding information, it can select the first grid inside the g×h grids that has inter coding information by a predefined scanning order.

Due to the buffer for storing inter coding information is shared with cross-component merge mode, it can check the CU prediction mode (e.g., intra prediction, or inter prediction) to identify if the information stored at a certain buffer position is inter coding or CCM information. In one embodiment, if the CU prediction mode is intra prediction, the stored information is CCM information. Otherwise (i.e., CU prediction mode is non-intra prediction), the stored information is inter coding information. In another embodiment, it can set an invalid inter prediction reference index or invalid MV value (e.g., horizontal or vertical MV value) to identify the stored information is CCM information. Otherwise (i.e., valid inter prediction index), the stored information is inter coding information. For example, in VVC standard specification, the inter prediction reference index greater than 2 is invalid, then it may set inter prediction reference index to a value greater than 2 to identify the stored information is CCM information (e.g., inter prediction reference index is 3).

Region-Wise Cross-Component Model Merge Method

According to this method, a current block is partitioned into two or more prediction regions/sub-blocks, where each region can be predicted by inter or intra coding tool. Furthermore, at least one of prediction regions is coded by CC merge mode, where the cross-component model of the at least one region is inherited from a spatial, historical, or temporal neighbouring block/position. In one embodiment, the current block is partitioned by quad-tree, binary-tree, or ternary-tree split. The split can be symmetric or asymmetric split.

In another embodiment, the current block is partition into two regions, where one of two regions is predicted by inter or intra coding tool, and another one is predicted by CC merge mode. The inherited candidate index of the region predicted by CC merge mode can be explicitly or implicitly indicated. For example, it can explicitly signal the candidate index by the method in section entitled: Signalling the Inherited Candidate Index in the List. For another example, it can implicitly select the first candidate in the list as the candidate index. The candidates in the list can be reordered by the method mentioned in the section entitled: Reordering the Candidates in the List.

In still another embodiment, current block is partition into two regions, two regions are both predicted by CC merge mode, and the first two candidates in the list are the candidate indexes of the two regions. It can implicitly set the candidate index of the first region (e.g., the region having the top-left sample of the current block) to the first candidate and set the candidate index of the second region to the second candidate. Besides, the list can be reordered by the method mentioned in the section entitled: Reordering the Candidates in the List. For another example, if two regions are both predicted by CC merge mode, an index is explicitly signalled to indicate the candidate index of the first region, and the candidate index of the second region is the signalled index+k or the signalled index −k, where k can be 1, 2, 3, 4, or 5. For still the same example, the candidate index of the first region is implicitly derived from the stored cross-component model at the top-left position of the current block relative to the top-left position in the previous coded slices/pictures as the method mentioned in the section entitled: Inheriting temporal neighbouring model parameters. In another embodiment, if two regions are both predicted by CC merge mode, the first candidate in the list is the candidate index of the two regions.

Figure 1B:
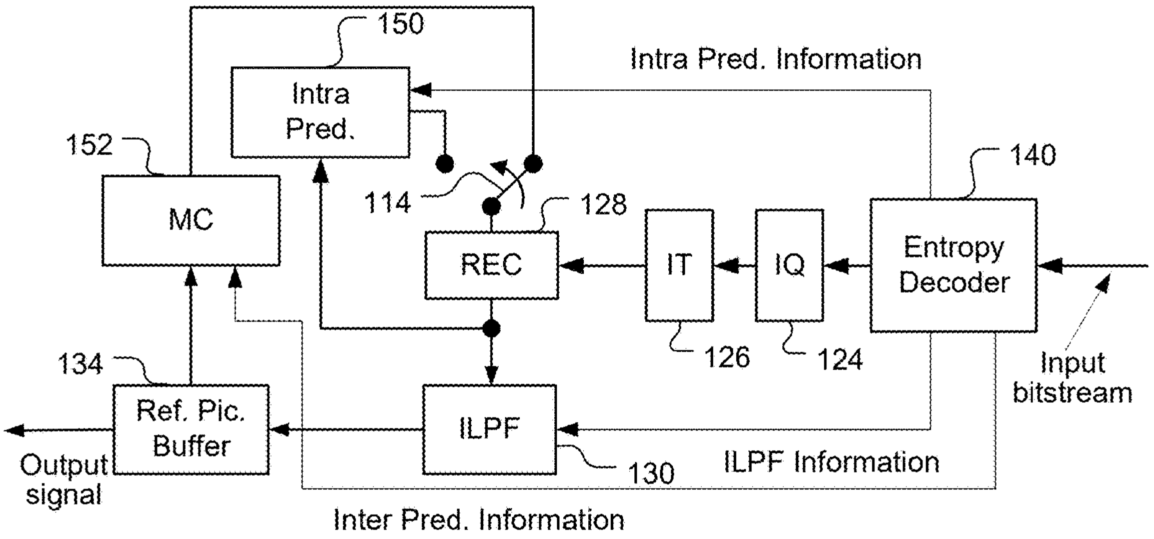
FIG. 1B illustrates a corresponding decoder for the encoder in FIG. 1A.
Figure 2:
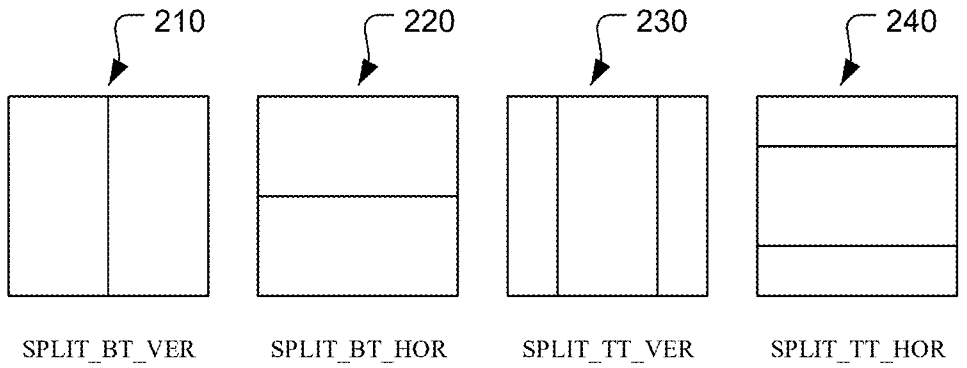
FIG. 2 illustrates examples of a multi-type tree structure corresponding to vertical binary splitting (SPLIT_ BT_VER), horizontal binary splitting (SPLIT_BT_HOR), vertical ternary splitting (SPLIT_ TT_VER), and horizontal ternary splitting (SPLIT_TT_HOR).
Figure 3:
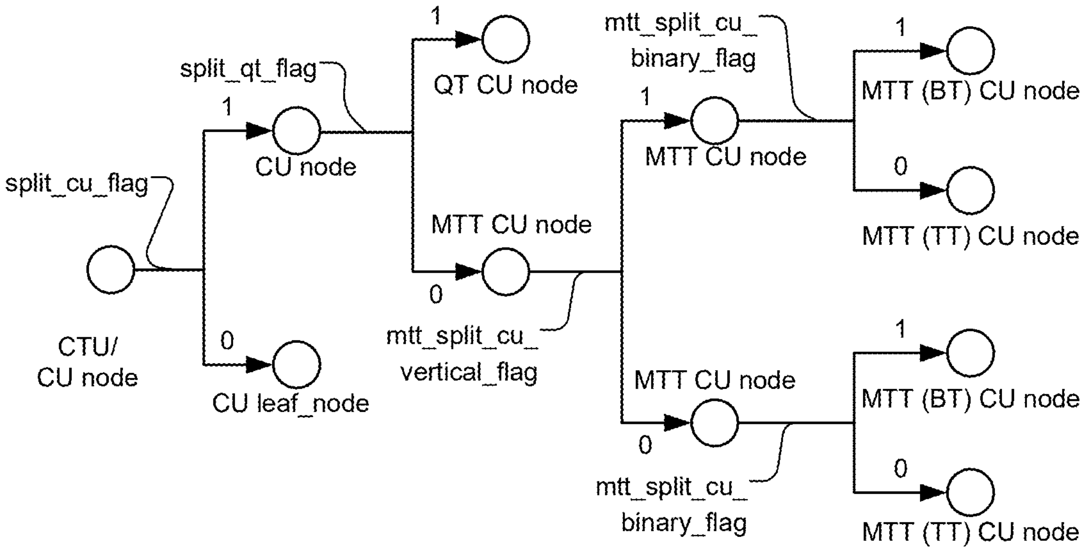
FIG. 3 illustrates an example of the signalling mechanism of the partition splitting information in quadtree with nested multi-type tree coding tree structure.
Figure 4:
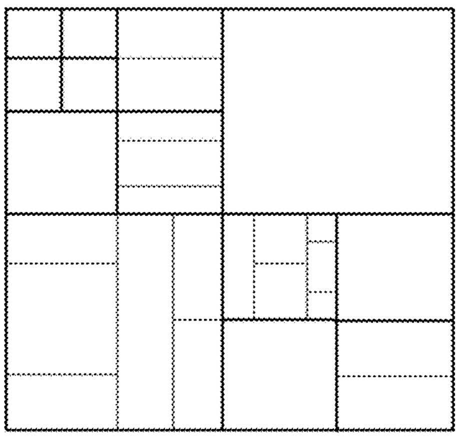
FIG. 4 shows an example of a CTU divided into multiple CUs with a quadtree and nested multi-type tree coding block structure, where the bold block edges represent quadtree partitioning and the remaining edges represent multi-type tree partitioning.
Figure 5:
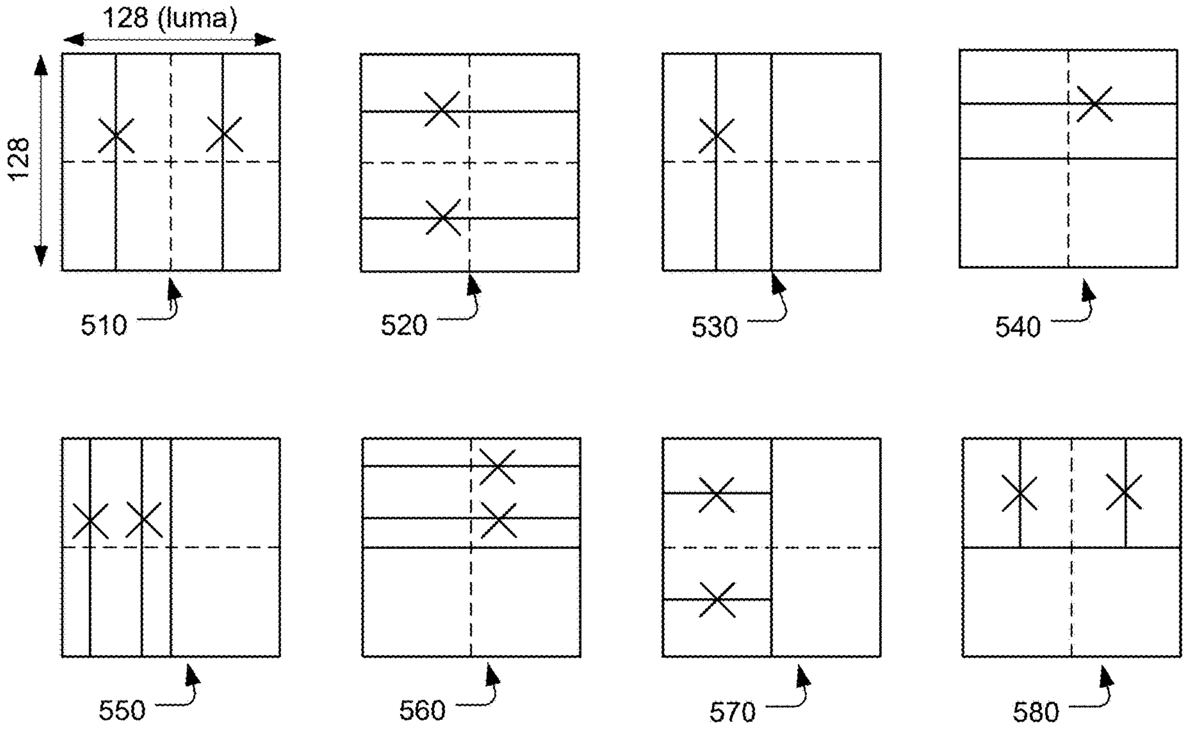
FIG. 5 shows some examples of TT split forbidden when either width or height of a luma coding block is larger than 64.
Figure 6:
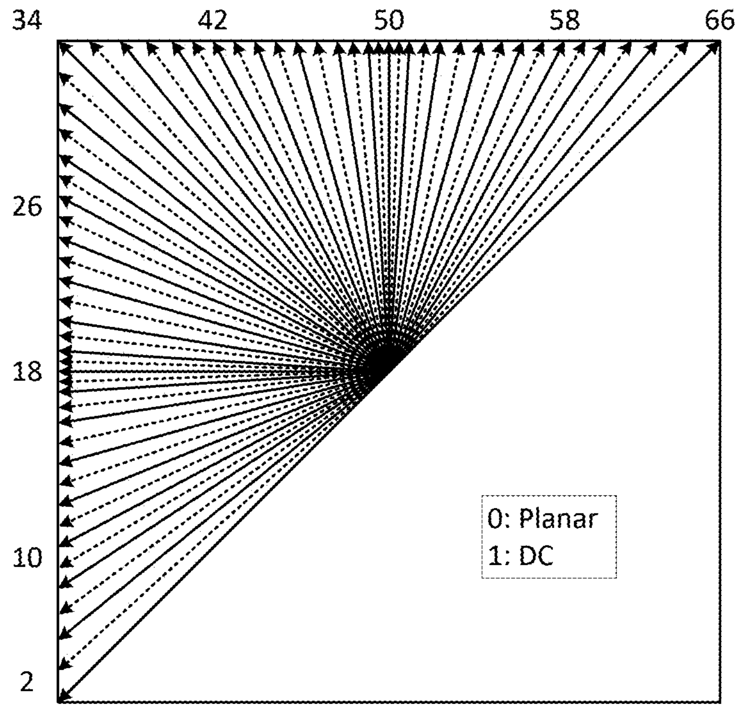
FIG. 6 shows the intra prediction modes as adopted by the VVC video coding standard.
Figure 7A:
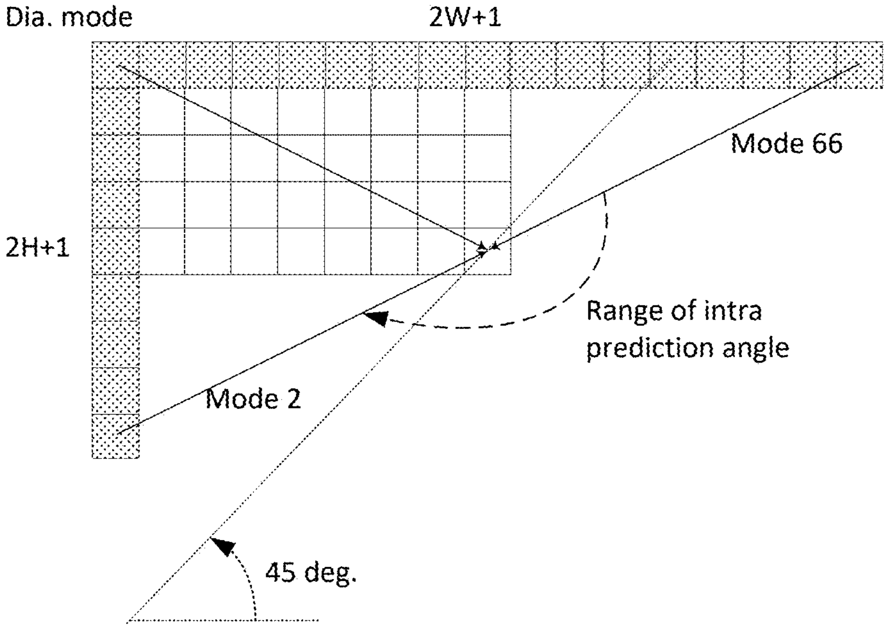
FIGS. 7A-B illustrate examples of wide-angle intra prediction a block with width larger than height (FIG. 7A) and a block with height larger than width (FIG. 7B).
Figure 7B:
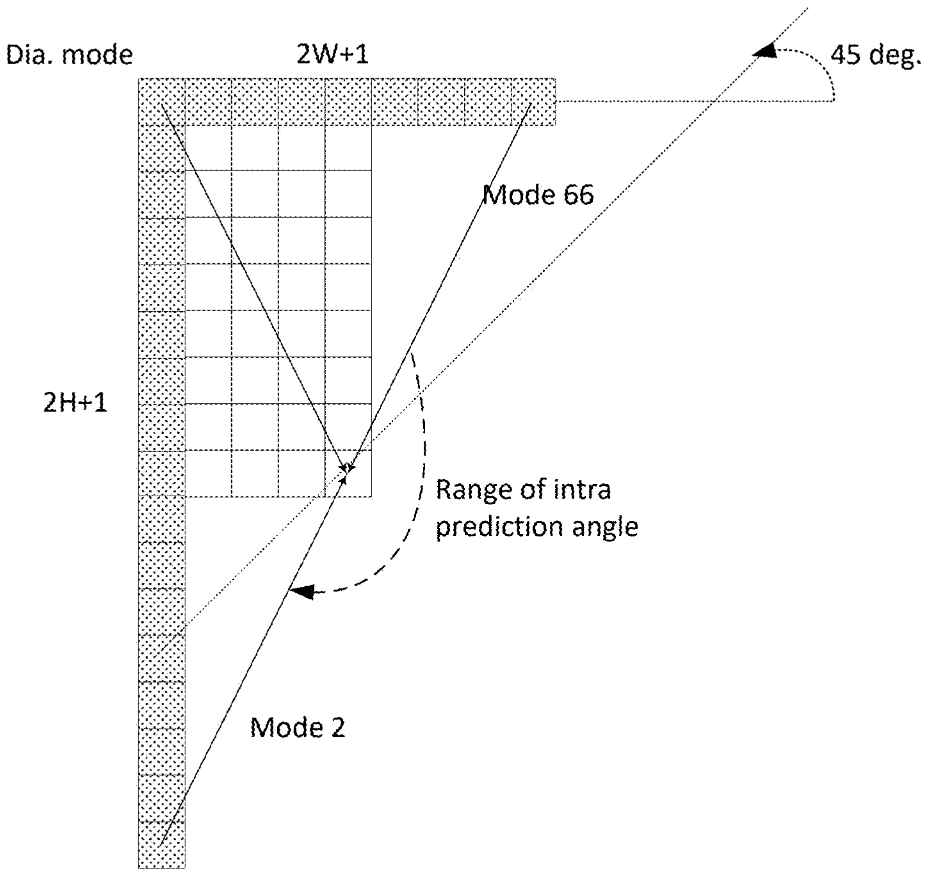
Figure 8:
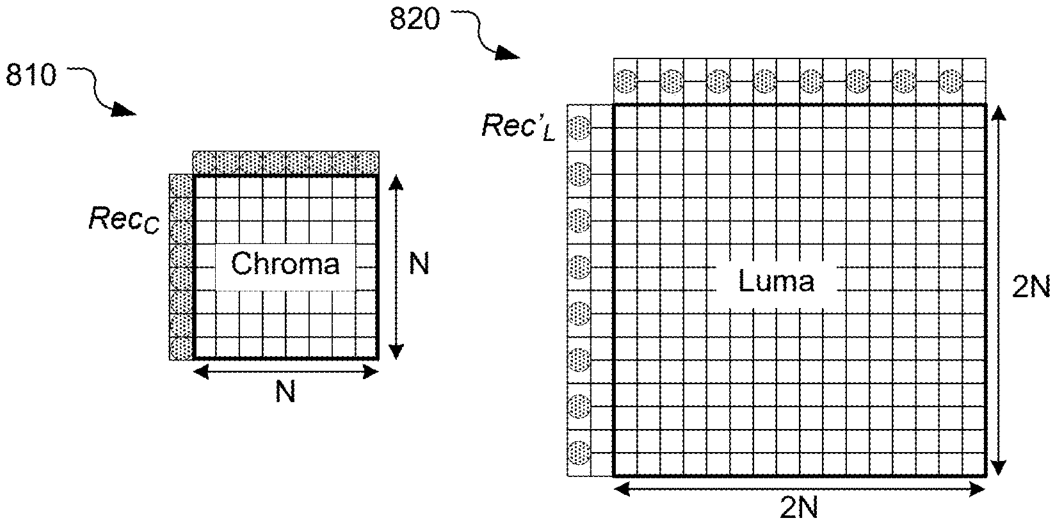
FIG. 8 shows an example of the location of the left and above samples and the sample of the current block involved in the CCLM_LT mode.
Figure 9:
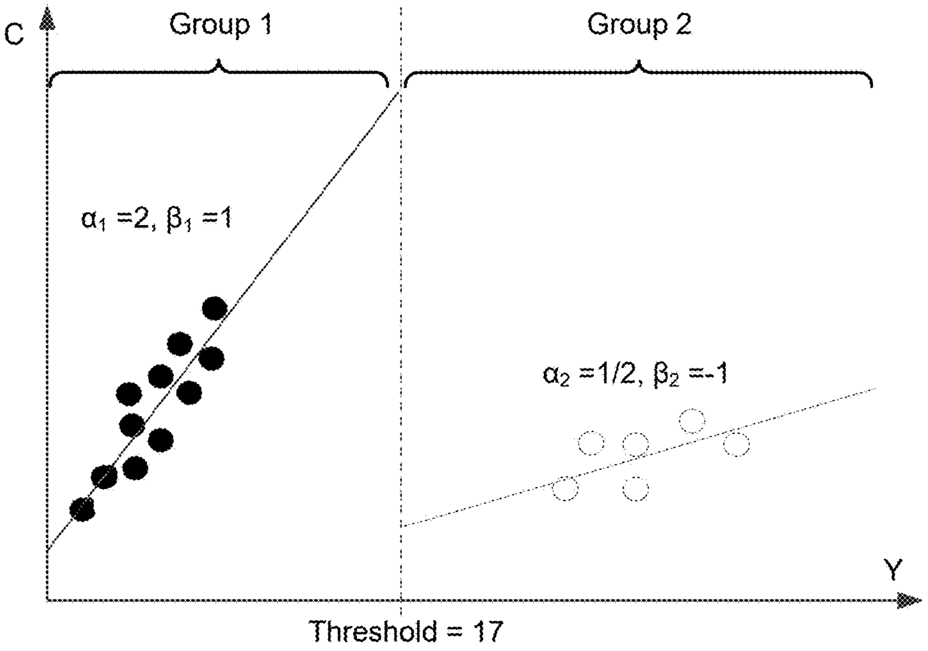
FIG. 9 shows an example of classifying the neighbouring samples into two groups.
Figure 10A:
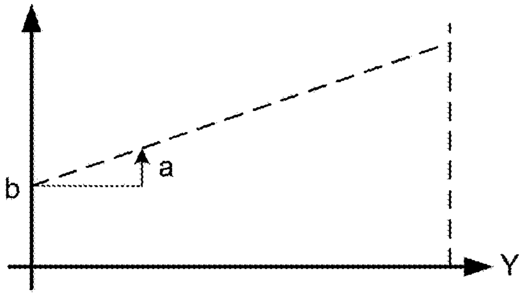
FIG. 10A illustrates an example of the CCLM model.
Figure 10B:
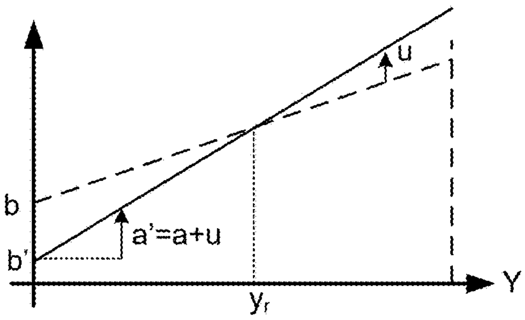
FIG. 10B illustrates an example of the effect of the slope adjustment parameter "u" for model update.
Figure 11:
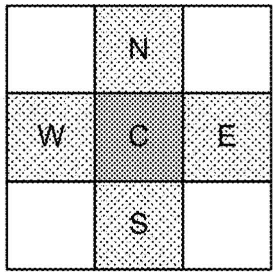
FIG. 11 illustrates an example of spatial part of the convolutional filter.
Figure 12:
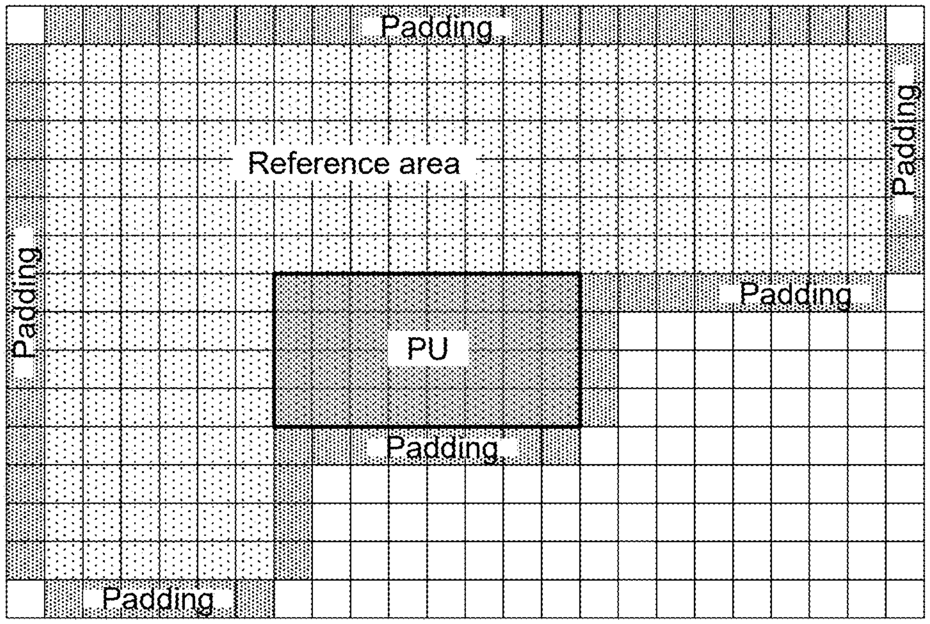
FIG. 12 illustrates an example of reference area with paddings used to derive the filter coefficients.
Figure 13:
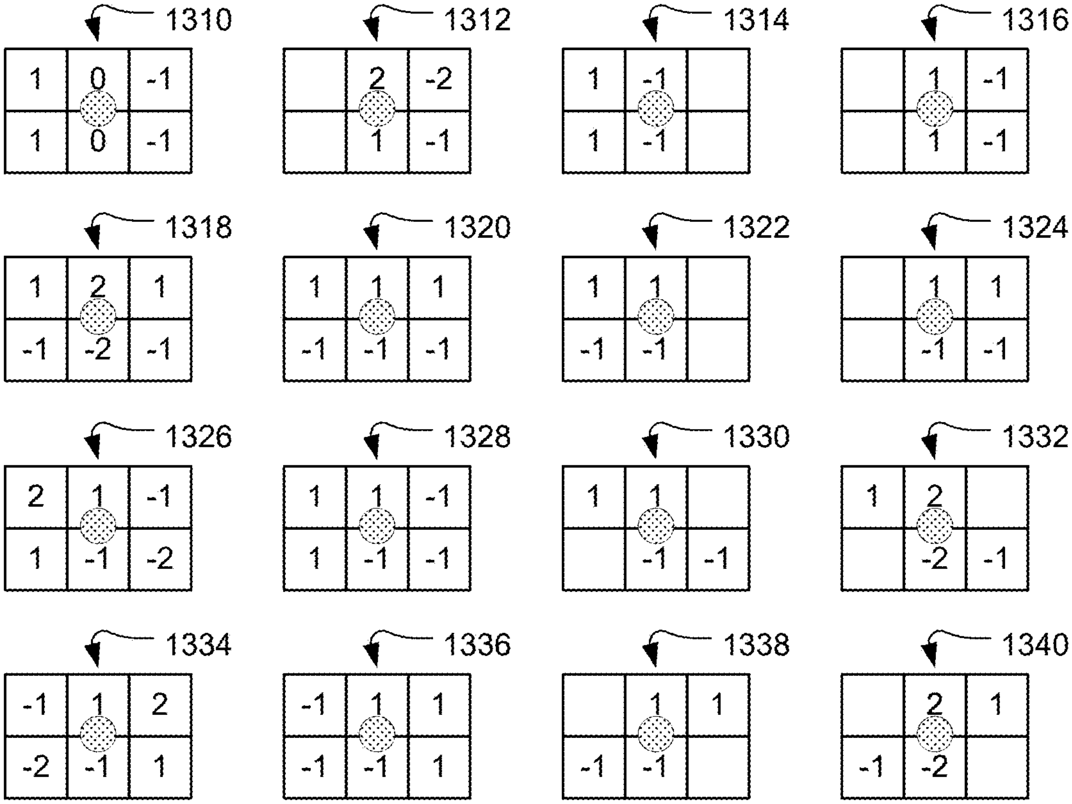
FIG. 13 illustrates the 16 gradient patterns for Gradient Linear Model (GLM).

The CCM information inheritance described above can be implemented in an encoder side or a decoder side. For example, any of the proposed CCM information inheritance can be implemented in an Intra/Inter coding module (e.g. Intra Pred. 150/MC 152 in FIG. 1B) in a decoder or an Intra/Inter coding module is an encoder (e.g. Intra Pred. 110/Inter Pred. 112 in FIG. 1A). Any of the proposed CCM information inheritance can also be implemented as a circuit coupled to the intra/inter coding module at the decoder or the encoder. However, the decoder or encoder may also use additional processing unit to implement the required cross-component prediction processing. While the Intra Pred. units (e.g. unit 110/112 in FIG. 1A and unit 150/152 in FIG. 1B) are shown as individual processing units, they may correspond to executable software or firmware codes stored on a media, such as hard disk or flash memory, for a CPU (Central Processing Unit) or programmable devices (e.g. DSP (Digital Signal Processor) or FPGA (Field Programmable Gate Array)).

Figure 30:
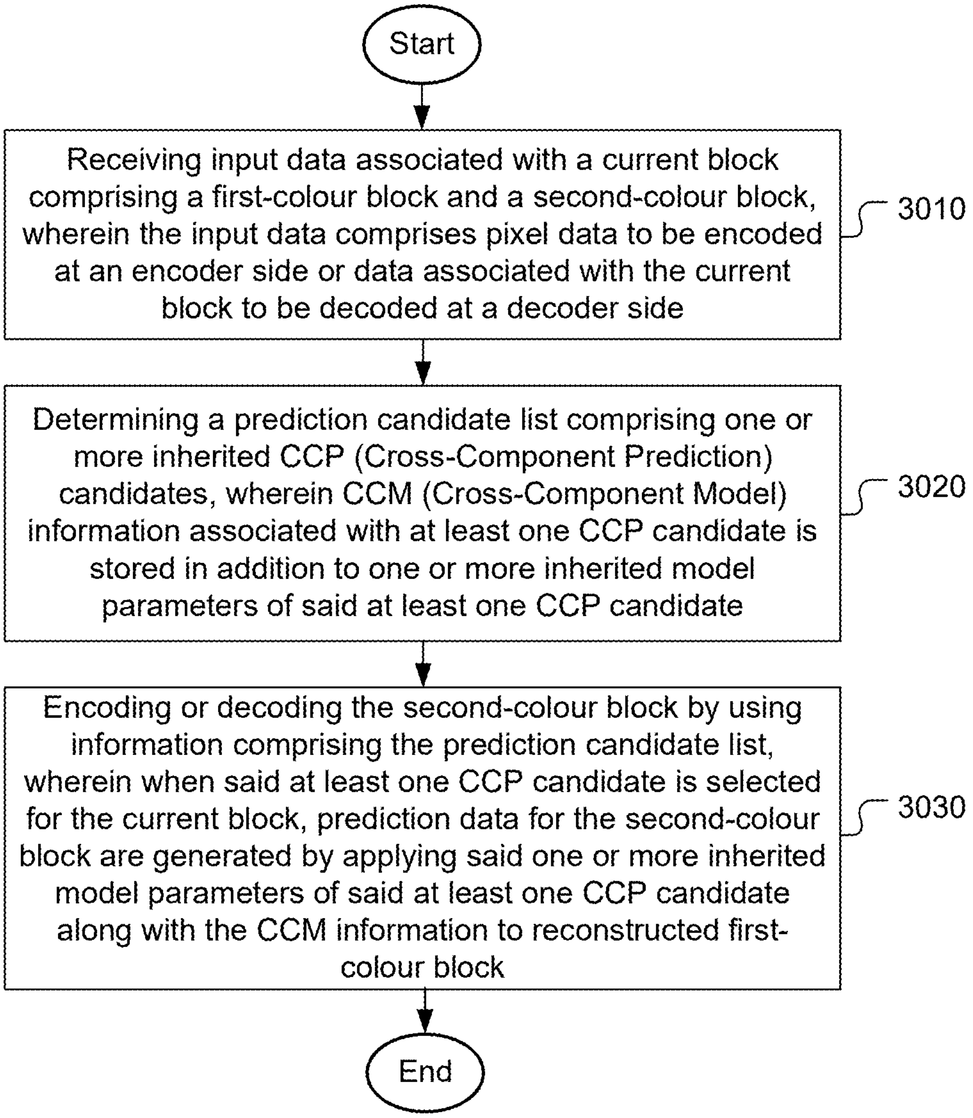
FIG. 30 illustrates a flowchart of an exemplary video coding system that inherits cross-component model information, in addition to model parameters, of an inherited cross-component prediction candidate according to an embodiment of the present invention.

FIG. 30 illustrates a flowchart of an exemplary video coding system that inherits cross-component model information, in addition to model parameters, of an inherited cross-component prediction candidate according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to the method, input data associated with a current block comprising a first-colour block and a second-colour block are received in step 3010, wherein the input data comprises pixel data to be encoded at an encoder side or data associated with the current block to be decoded at a decoder side. A prediction candidate list comprising one or more inherited CCP (Cross-Component Prediction) candidates is determined in step 3020, wherein CCM (Cross-Component Model) information associated with at least one CCP candidate is stored in addition to one or more inherited model parameters of said at least one CCP candidate. The second-colour block is encoded or decoded by using information comprising the prediction candidate list in step 3030, wherein when said at least one CCP candidate is selected for the current block, prediction data for the second-colour block are generated by applying said one or more inherited model parameters of said at least one CCP candidate along with the CCM information to reconstructed first-colour block.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding colour pictures using coding tools including one or more cross component models related modes, the method comprising:

receiving input data associated with a current block comprising a first-colour block and a second-colour block, wherein the input data comprises pixel data to be encoded at an encoder side or data associated with the current block to be decoded at a decoder side;

determining a prediction candidate list comprising one or more inherited CCP (Cross-Component Prediction) candidates, wherein CCM (Cross-Component Model) information associated with at least one CCP candidate is stored in addition to one or more inherited model parameters of said at least one CCP candidate; and encoding or decoding the second-colour block by using information comprising the prediction candidate list, wherein when said at least one CCP candidate is selected for the current block, prediction data for the second-colour block are generated by applying said one or more inherited model parameters of said at least one CCP candidate along with the CCM information to reconstructed first-colour block.

2. The method of claim 1, wherein the CCM information comprises prediction mode, model index for indicating a model shape being used, classification threshold for multi-model, down-sampling filter flag, down-sampling filtering index, number of neighbouring lines used to derive model, type of templates used to derive model, post-filtering flag, or a combination thereof.

3. The method of claim 1, wherein the CCM information corresponds to a prediction mode and the prediction mode is from a mode set comprising CCLM (Cross-Component Linear Model) or MMLM (Multiple Model CCLM Mode).

4. The method of claim 1, wherein the CCM information corresponds to a prediction mode and the prediction mode corresponds to CCCM (Convolutional Cross-Component Model) mode, and wherein the CCM information further comprises CCCM related information.

5. The method of claim 4, wherein the CCCM related information comprises indication associated with CCCM convolution filter shape, CCCM mode index, CCCM model using non-downsampled samples, CCCM model with multiple down-sampling filters, mixed CCCM model with various terms, gradient and location based CCCM (GL-CCCM) or a combination thereof.

6. The method of claim 1, wherein the CCM information corresponds to a prediction mode and the prediction mode corresponds to GLM (Gradient Linear Model) mode, and wherein the CCM information further comprises GLM related information.

7. The method of claim 6, wherein the GLM related information comprises indication associated with down-sampling filtering index, gradient down-sampled filter, GLM model with luma term or a combination thereof.

8. The method of claim 1, wherein the CCM information corresponds to a prediction mode and the prediction mode corresponds to cross-component multi-model mode, and wherein the CCM information further comprises cross-component multi-model mode related information.

9. The method of claim 8, wherein the cross-component multi-model mode related information comprises indication associated with multi-model on/off flag, multi-model classification threshold or a combination thereof.

10. The method of claim 1, wherein at least one of said one or more inherited model parameters of said at least one CCP candidate are refined based on the CCM information.

11. The method of claim 10, wherein a refinement process for refining said at least one of said one or more inherited model parameters of said at least one CCP candidate uses a same type of template and/or a same number of neighbouring lines as said at least one CCP candidate.

12. The method of claim 10, wherein a refinement process for refining said at least one of said one or more inherited model parameters of said at least one CCP candidate uses a different type of template and/or a different number of neighbouring lines from said at least one CCP candidate.

13. The method of claim 12, wherein the different type of template and/or the different number of neighbouring lines is selected according to template cost.

14. An apparatus for video coding, the apparatus comprising one or more electronics or processors arranged to:

receive input data associated with a current block comprising a first-colour block and a second-colour block, wherein the input data comprises pixel data to be encoded at an encoder side or data associated with the current block to be decoded at a decoder side;

determine a prediction candidate list comprising one or more inherited CCP (Cross-Component Prediction) candidates, wherein CCM (Cross-Component Model) information associated with at least one CCP candidate is stored in addition to one or more inherited model parameters of said at least one CCP candidate; and encode or decode the second-colour block by using information comprising the prediction candidate list, wherein when said at least one CCP candidate is selected for the current block, prediction data for the second-colour block are generated by applying said one or more inherited model parameters of said at least one CCP candidate along with the CCM information to reconstructed first-colour block.

* * * * *